US012609124B2

(12) United States Patent

Neustedter et al.

(10) Patent No.: US 12,609,124 B2

(45) Date of Patent: Apr. 21, 2026

(54) VOICE AGENT SYSTEM

(71) Applicant: ROCKWELL AUTOMATION TECHNOLOGIES, INC., Mayfield Heights, OH (US)

(72) Inventors: Aaron J. Neustedter, Milwaukee, WI (US); Thong T. Nguyen, New Berlin, WI (US); Paul D. Schmirler, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 239 days.

(21) Appl. No.: 18/446,635

(22) Filed: Aug. 9, 2023

(65) Prior Publication Data

US 2025/0054501 A1 Feb. 13, 2025

(51) Int. Cl.
*G10L 17/22* (2013.01)
*G10L 17/08* (2013.01)

(52) U.S. Cl.
CPC .............. *G10L 17/22* (2013.01); *G10L 17/08* (2013.01)

(58) Field of Classification Search
None
See application file for complete search history.

(56) References Cited

U.S. PATENT DOCUMENTS

2020/0073367 A1* 3/2020 Nguyen ................ G06F 16/683
2020/0251107 A1* 8/2020 Wang ...................... G10L 15/22
2020/0272690 A1* 8/2020 Howard ................... G06N 5/02
2020/0348651 A1 11/2020 Nguyen
2021/0065020 A1 3/2021 Schmirler
2022/0093094 A1* 3/2022 Krishnan ............... G06V 10/40
2022/0253044 A1 8/2022 Tremblay
2024/0212689 A1* 6/2024 Mohammad .......... G10L 21/028

OTHER PUBLICATIONS

"AI chatbot that's easy to use", https://www.ibm.com/products/watson-assistant/artificial-intelligence?utm_content=SRCWW&p1=Search&p4=43700074369651641&p5=p&&msclkid=81d683c118a1141023f0e7c739e0c0f0&gclid=81d683c118a1141023f0e7c739e0c0f0&gclsrc=3p.ds, ibm.com, accessed Mar. 16, 2023, 10 pages.

(Continued)

*Primary Examiner* — Pierre Louis Desir

(57) ABSTRACT

An illustrative method includes a voice agent system establishing a plurality of user-agent conversations, wherein each user-agent conversation between a user and the voice agent system is established in response to the user speaking a trigger word and the plurality of user-agent conversations continue simultaneously in a same physical area, detecting an utterance in an audio stream associated with the physical area, determining, based on the utterance, that the utterance potentially belongs to a particular user-agent conversation among the plurality of user-agent conversations and determining a confidence score that the utterance belongs to the particular user-agent conversation, identifying a candidate action to be performed by the voice agent system based on the utterance, determining an overall confidence score of the candidate action based on the confidence score that the utterance belongs to the particular user-agent conversation, and performing an operation based on the overall confidence score of the candidate action.

20 Claims, 8 Drawing Sheets

(56)             References Cited

OTHER PUBLICATIONS

"Bot in the Bunch: Facilitating Group Chat Discussion by Improving Efficiency and Participation with a Chatbot", https://www.researchgate.net/publication/339438103_Bot_in_the_Bunch_Facilitating_Group_Chat_Discussion_by_Improving_Efficiency_and_Participation_with_a_Chatbot, 2020 CHI Conference on Human Factors in Computing Systems, Honolulu, HI, Feb. 2020; DOI: 10.1145/3313831.3376785, 11 pages.

"Channel and Group chat conversations with a Microsoft Teams bot", https://learn.microsoft.com/en-us/microsoftteams/platform/resources/bot-v3/bot-conversations/bots-conv-channel, Microsoft.com, Nov. 25, 2022, 7 pages.

"Conversation Mode helps interactions with Alexa feel more natural", https://www.aboutamazon.com/news/devices/conversation-mode-helps-interactions-with-alexa-feel-more-natural, Amazon.com, Written by Amazon Staff, Sep. 26, 2022, 4 pages.

"Have a conversation with your speaker or display", https://support.google.com/googlenest/answer/7685981?hl=en&co=genie.platform%3dandroid, google.com, accessed Mar. 16, 2023, 2 pages.

"Have more natural conversations with Google Assistant", https://blog.google/products/assistant/assistant-io-2022, google.com, Sissie Hsiao, May 11, 2022, 3 pages.

"New Alexa feature enables natural, multiparty interactions", Amazon Science, https://www.amazon.science/blog/new-alexa-feature-enables-natural-multiparty-interactions, Alexa AI Team, Nov. 18, 2021, 8 pages.

"Set up voice recognition on HomePod or HomePod Mini", https://support.apple.com/en-us/ht204753, apple.com, accessed Mar. 16, 2023, 3 pages.

"Start a conversation with your personal productivity assistant in Outlook with Cortana", https://techcommunity.microsoft.com/t5/outlook-blog/start-a-conversation-with-your-personal-productivity-assistant/ba-p/2071416, microsoft.com, Eugenie Burrage, Feb. 1, 2021, 14 pages.

"Voice Match and media on shared Google Nest or Home devices", https://support.google.com/googlenest/answer/7342711?hl=en&co=genie.platform%3dandroid, google.com, accessed Mar. 16, 2023, 3 pages.

"What Is Alexa Voice ID?", https://www.amazon.com/gp/help/customer/display.html?nodeId=GYCXKY2AB2QWZT2X, Amazon.com, accessed Mar. 16, 2023, 2 pages.

"What's Microsoft's vision for conversational AI? Computers that understand you", https://news.microsoft.com/source/features/ai/microsoft-build-future-of-natural-language, microsoft.com, John Roach, May 6, 2019, 9 pages.

* cited by examiner

200

400

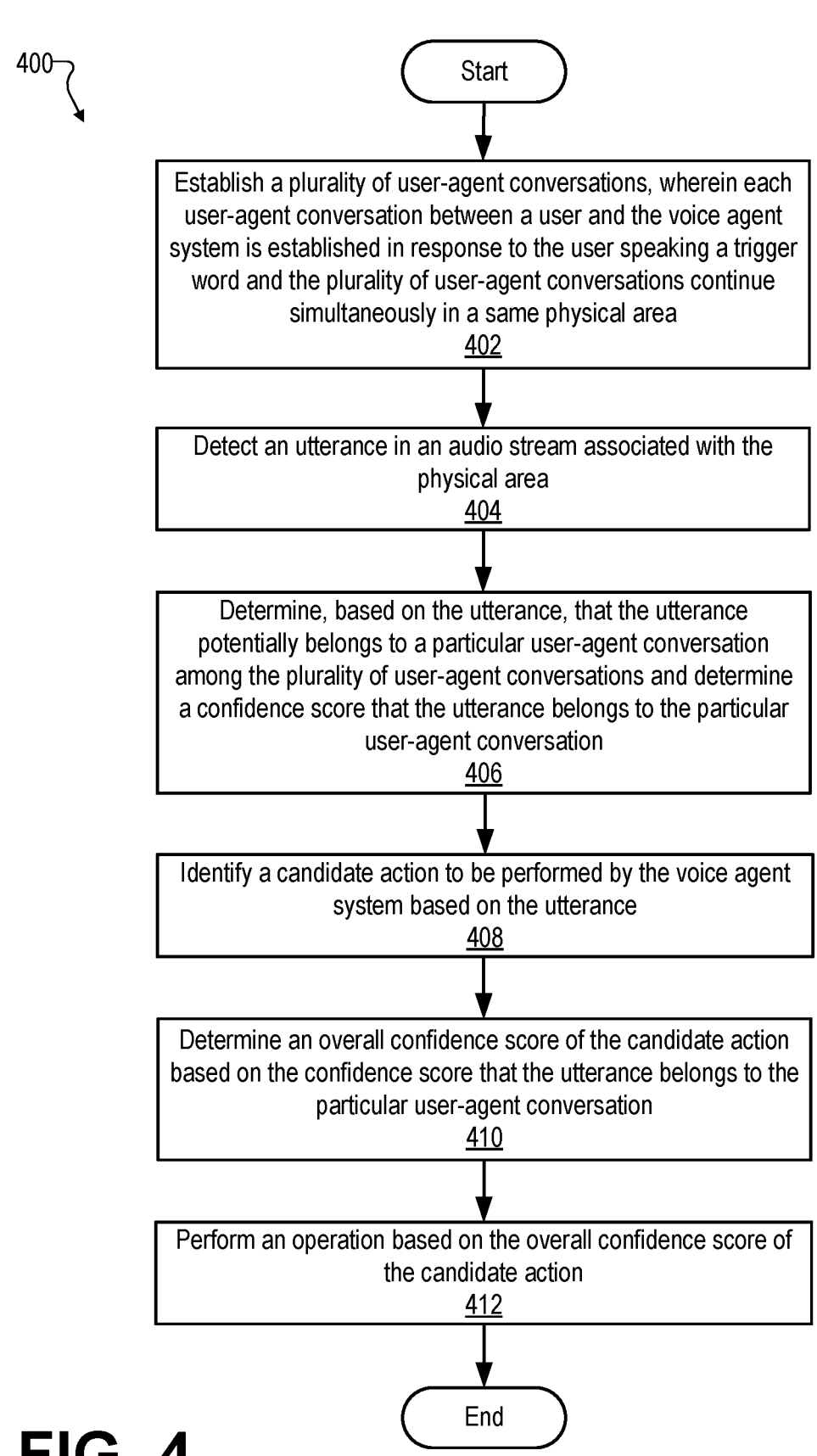

Start

Establish a plurality of user-agent conversations, wherein each user-agent conversation between a user and the voice agent system is established in response to the user speaking a trigger word and the plurality of user-agent conversations continue simultaneously in a same physical area
402

Detect an utterance in an audio stream associated with the physical area
404

Determine, based on the utterance, that the utterance potentially belongs to a particular user-agent conversation among the plurality of user-agent conversations and determine a confidence score that the utterance belongs to the particular user-agent conversation
406

Identify a candidate action to be performed by the voice agent system based on the utterance
408

Determine an overall confidence score of the candidate action based on the confidence score that the utterance belongs to the particular user-agent conversation
410

Perform an operation based on the overall confidence score of the candidate action
412

End

FIG. 4

500

Determine an utterance content: "ABAI, activate debug mode for Drive 3"
Determine a candidate action: activating debug mode on Drive 3

65% confident in the utterance content

65% confident in the candidate action

↓

Determine whether the utterance belongs to a user-agent conversation

87% confident that the utterance belongs to Carol-agent conversation

84% confident in the candidate action

↓

Determine whether Drive 3 has a debug mode and also has an error notification

100% confident that Drive 3 has debug mode and has error notification

89% confident in the candidate action

↓

Determine user location relative to Drive 3

85% confident that the user location of Carol is proximate to Drive 3

92% confident in the candidate action

FIG. 5A

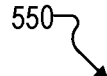

550

Determine an utterance content: "Yes, the stop by the goalie really saved AC Milan"
Determine a candidate action: stop an industrial device 18% confident in the utterance content 18% confident in the candidate action

↓

Determine whether the utterance belongs to a user-agent conversation

14% confident that the utterance belongs to Carol-agent conversation

12% confident in the candidate action

↓

Determine an emotional distress level of the utterance

The emotional distress level of the utterance is 10%

11% confident in the candidate action

FIG. 5B

VOICE AGENT SYSTEM

BACKGROUND

The present disclosure relates to a voice agent system. In a more particular example, the disclosure relates to technologies for the voice agent system to perform utterance processing.

BRIEF DESCRIPTION

The following presents a simplified summary in order to provide a basic understanding of some aspects described herein. This summary is not an extensive overview nor is intended to identify key/critical elements or to delineate the scope of the various aspects described herein. The sole purpose of this summary is to present some concepts in a simplified form as a prelude to the more detailed description that is presented later.

In some embodiments, a method is provided. The method comprises establishing, by a voice agent system, a plurality of user-agent conversations, wherein each user-agent conversation between a user and the voice agent system is established in response to the user speaking a trigger word and the plurality of user-agent conversations continue simultaneously in a same physical area; detecting, by the voice agent system, an utterance in an audio stream associated with the physical area; determining, by the voice agent system and based on the utterance, that the utterance potentially belongs to a particular user-agent conversation among the plurality of user-agent conversations and determining a confidence score that the utterance belongs to the particular user-agent conversation; identifying, by the voice agent system, a candidate action to be performed by the voice agent system based on the utterance; determining, by the voice agent system, an overall confidence score of the candidate action based on the confidence score that the utterance belongs to the particular user-agent conversation; and performing, by the voice agent system, an operation based on the overall confidence score of the candidate action.

In some embodiments, a voice agent system is provided. The voice agent comprises a memory storing instructions; and a processor communicatively coupled to the memory and configured to execute the instructions to: establish a plurality of user-agent conversations, wherein each user-agent conversation between a user and the voice agent system is established in response to the user speaking a trigger word and the plurality of user-agent conversations continue simultaneously in a same physical area; detect an utterance in an audio stream associated with the physical area; determine, based on the utterance, that the utterance potentially belongs to a particular user-agent conversation among the plurality of user-agent conversations and determine a confidence score that the utterance belongs to the particular user-agent conversation; identify a candidate action to be performed by the voice agent system based on the utterance; determine an overall confidence score of the candidate action based on the confidence score that the utterance belongs to the particular user-agent conversation; and perform an operation based on the overall confidence score of the candidate action.

In some embodiments, a non-transitory computer-readable medium is provided. The non-transitory computer-readable medium stores instructions that, when executed, direct a processor of a voice agent system to: establish a plurality of user-agent conversations, wherein each user-agent conversation between a user and the voice agent system is established in response to the user speaking a trigger word and the plurality of user-agent conversations continue simultaneously in a same physical area; detect an utterance in an audio stream associated with the physical area; determine, based on the utterance, that the utterance potentially belongs to a particular user-agent conversation among the plurality of user-agent conversations and determine a confidence score that the utterance belongs to the particular user-agent conversation; identify a candidate action to be performed by the voice agent system based on the utterance; determine an overall confidence score of the candidate action based on the confidence score that the utterance belongs to the particular user-agent conversation; and perform an operation based on the overall confidence score of the candidate action.

To the accomplishment of the foregoing and related ends, certain illustrative aspects are described herein in connection with the following description and the accompanying drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates an example utterance processing method.

FIGS. 5A and 5B illustrate examples of determining an overall confidence score of a candidate action for an example utterance.

DETAILED DESCRIPTION

Figure 1:
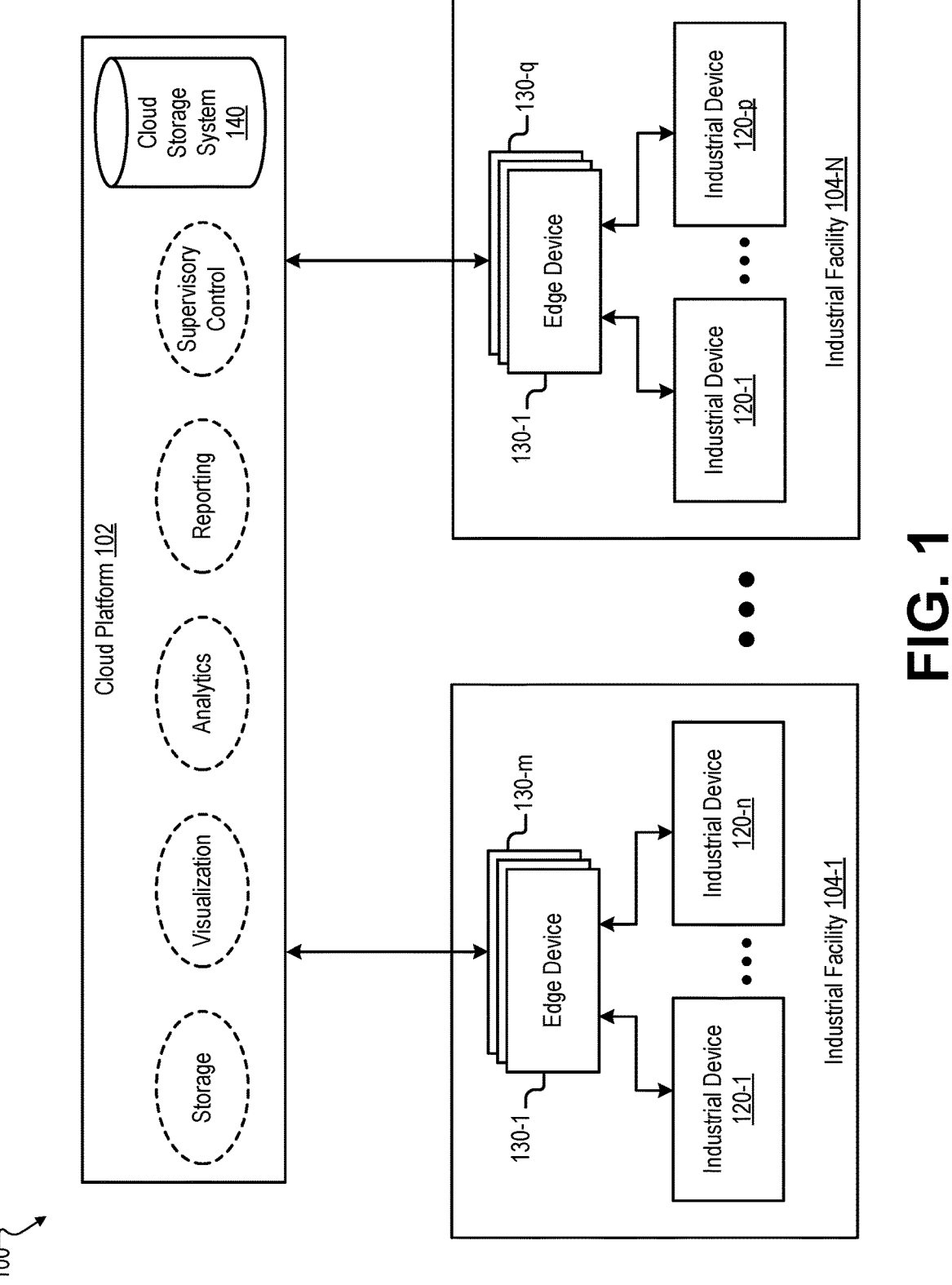
FIG. 1 illustrates an example system that manages data of one or more industrial automation systems.

The present disclosure is now described with reference to the drawings. In the following description, specific details may be set forth for purposes of explanation. It should be understood that the present disclosure may be implemented without these specific details.

As used herein, the terms "component," "system," "platform," "layer," "controller," "terminal," "station," "node," "interface" are intended to refer to a computer-related entity or an entity related to, or that is part of, an operational apparatus with one or more specific functionalities, wherein such entities may be hardware, a combination of hardware and software, software, or software in execution. For example, a component may be, but is not limited to being, a process running on a processor, a processor, a hard disk drive, multiple storage drives (of optical or magnetic storage medium) including affixed (e.g., screwed or bolted) or removable affixed solid-state storage drives, an object, an executable object, a thread of execution, a computer-executable program, and/or a computer. By way of illustration, both an application running on a server and the server may be a component. One or more components may reside within a process and/or thread of execution, and a component may be localized on one computer and/or distributed between two or more computers.

In addition, components as described herein may execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component may be an apparatus with specific functionality provided by mechanical parts operated by electric or electronic circuitry which is operated by a software or a firmware application executed by a processor, wherein the processor may be internal or external to the apparatus and may execute at least a part of the software or firmware application. As yet another example, a component may be an apparatus that provides specific functionality through electronic components without mechanical parts, the electronic components may include a processor therein to execute software or firmware that provides at least in part the functionality of the electronic components. As yet another example, interface(s) may include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" generally refer to the process of reasoning about or inferring states of the system, environment, and/or user from a set of observations as captured via events and/or data. For example, inference may be used to identify a specific context or action, or may generate a probability distribution over states. The inference may be probabilistic, e.g., the inference may be the computation of a probability distribution over states of interest based on a consideration of data and events. Inference may also refer to techniques employed for composing higher-level events from a set of events and/or data. Such inference may result in the construction of new events or actions from a set of observed events and/or stored event data, regardless of whether or not the events are correlated in close temporal proximity, and whether the events and data come from one or several event and data sources.

Moreover, the term "or" is intended to mean an inclusive "or" rather than an exclusive "or." In particular, unless clear from the context or specified otherwise, the phrase "X employs A or B" is intended to mean any of the natural inclusive permutations. Thus, the phrase "X employs A or B" is satisfied by any of the following instances: X employs A, X employs B, or X employs both A and B. In addition, the articles "a" and "an" as used in this present disclosure and the appended claims should generally be construed to mean "one or more" unless clear from the context or specified otherwise to be directed to a singular form.

Furthermore, the term "set" as used herein excludes the empty set, e.g., the set with no elements therein. Thus, a "set" in the present disclosure may include one or more elements or entities. For example, a set of controllers may include one or more controllers, a set of data resources may include one or more data resources, etc. Similarly, the term "group" as used herein refers to a collection of one or more entities. For example, a group of nodes refers to one or more nodes.

Various aspects or features will be presented in terms of systems that may include a number of devices, components, modules, and the like. It should be understood that various systems may include additional devices, components, modules, etc. and/or may not include all of the devices, components, modules, etc. that are discussed with reference to the figures. A combination of these approaches may also be used.

Today, voice assistance becomes increasingly prevalent with voice assistants being incorporated into a wide variety of devices and applications. To use a voice assistant, a user may verbally communicate with the voice assistant in a conversation between the user and the voice assistant. For example, the user may speak one or more utterances to the voice assistant, thereby requesting the voice assistant to provide information of interest and/or to perform corresponding actions. In order to correctly identify the information and/or the actions requested by the user, an existing voice assistant may require other conversations within a communication range of the voice assistant to be stopped while the user speaks to the voice assistant. To avoid negative impacts on its performance, the voice assistant may also require the user not to participate in other conversations while participating in the conversation between the user and the voice assistant. Thus, the existing voice assistant is generally incapable of providing natural experience to the user when the user interacts with the voice assistant.

Moreover, in an industrial context, multiple workers may work in the same area of an industrial facility and may communicate simultaneously in different conversations. In this situation, it is generally impossible to require other workers to remain silent each time a user speaks to the voice assistant. Accordingly, an utterance spoken in a nearby conversation may trigger the voice assistant to perform an unintentional action (e.g., start or stop an industrial machine) that is not requested by the user, which may result in severe consequences such as industrial accidents or manufacturing disruption. Thus, as the existing voice assistant is incapable of filtering out utterances in nearby conversations and being responsive only to utterances spoken by one or more particular users to the voice assistant, the existing voice assistant generally cannot be used in the industrial context.

Systems and methods described herein are capable of establishing and monitoring a plurality of user-agent conversations in which each user-agent conversation between a user and the voice agent system is established in response to the user speaking a trigger word of the voice agent system. For each utterance being detected, the systems and methods may determine whether the utterance belongs to a user-agent conversation among the plurality of user-agent conversations that are established and currently monitored by the voice agent system. If the systems and methods determine that the utterance belongs to a particular user-agent conversation associated with a particular user among the plurality of user-agent conversations, the systems and methods may include the utterance in the particular user-agent conversation. Accordingly, the systems and methods may keep track of the utterances spoken in each user-agent conversation. In addition, based on a confidence score that the utterance belongs to the particular user-agent conversation associated with the particular user and based on other factors, the systems and methods may determine that the particular user requests the voice agent system to perform an action using the utterance in the particular user-agent conversation, and thus the systems and methods may perform the action indicated in the utterance accordingly.

To illustrate, the systems and methods may establish a plurality of user-agent conversations. Each user-agent conversation may be a conversation between a user and a voice agent system and may be established by the voice agent system in response to the user speaking a trigger word. The plurality of user-agent conversations may continue simultaneously in a same physical area.

The systems and methods may detect an utterance in an audio stream associated with the physical area. Based on the utterance, the systems and methods may determine that the utterance potentially belongs to a particular user-agent conversation of a particular user among the plurality of user-agent conversations. For example, the systems and methods may determine a voice signature of the utterance, and determine that the voice signature of the utterance matches a voice signature profile associated with the particular user-agent conversation. Accordingly, the systems and methods may determine that the utterance potentially belongs to the particular user-agent conversation of the particular user. The systems and methods may determine a confidence score that the utterance belongs to the particular user-agent conversation. The confidence score that the utterance belongs to the particular user-agent conversation may indicate a level at which the systems and methods are confident that the utterance is spoken by the particular user to the voice agent system in the particular user-agent conversation initiated by the particular user with the voice agent system using the trigger word. As described herein, the confidence score that the utterance belongs to the particular user-agent conversation may be determined based on one or more utterance contexts (e.g., the voice signature, the utterance content, the user orientation, etc.) associated with the utterance and/or one or more conversation contexts (e.g., the voice signature profile, the topic, etc.) associated with the particular user-agent conversation.

The systems and methods may identify a candidate action to be performed by the voice agent system based on the utterance. The systems and methods may also determine an overall confidence score of the candidate action based on the confidence score that the utterance belongs to the particular user-agent conversation and based on other factors. The overall confidence score may indicate a level at which the systems and methods are confident that the voice agent system is requested to perform the candidate action by the particular user in the particular user-agent conversation using the utterance.

After the overall confidence score of the candidate action is determined, the systems and methods may perform an operation based on the overall confidence score of the candidate action. For example, the systems and methods may determine that the overall confidence score of the candidate action satisfies a first overall confidence score threshold (e.g., the overall confidence score≥80%). In this case, the systems and methods may perform the candidate action. Alternatively, the systems and methods may determine that the overall confidence score of the candidate action does not satisfy a second overall confidence score threshold (e.g., the overall confidence score<10%). In this case, the systems and methods may ignore the utterance without performing the candidate action determined from the utterance. Alternatively, the systems and methods may determine that the overall confidence score of the candidate action satisfies the second overall confidence score threshold and does not satisfy the first overall confidence score threshold (e.g., 10%≤the overall confidence score<80%). In this case, the systems and methods may request a user confirmation of the candidate action from the particular user associated with the particular user-agent conversation. Based on the user confirmation of the candidate action provided by the particular user, the systems and methods may or may not perform the candidate action accordingly.

The systems and methods described herein may be advantageous in a number of technical respects. For example, as described above, the systems and methods may establish and monitor the plurality of user-agent conversations, in which each user-agent conversation between a user and the voice agent system is established in response to the user speaking a trigger word of the voice agent system. For each user-agent conversation among the plurality of user-agent conversations, the systems and methods may determine one or more utterances that belong to the user-agent conversation and include these utterances in the user-agent conversation, thereby monitoring the user-agent conversation.

For example, when an utterance is detected, the systems and methods may determine a voice signature of the utterance, and determine that the voice signature of the utterance matches a voice signature profile associated with a particular user-agent conversation of a particular user. Accordingly, the systems and methods may determine that the utterance potentially belongs to the particular user-agent conversation. In some embodiments, the systems and methods may determine a confidence score that the utterance belongs to the particular user-agent conversation based on various factors (e.g., the voice signature of the utterance, the voice signature profile associated with the particular user-agent conversation, the utterance content of the utterance, the topic of the particular user-agent conversation, etc.). The systems and methods may then determine whether the confidence score that the utterance belongs to the particular user-agent conversation satisfies a confidence score threshold. If the confidence score that the utterance belongs to the particular user-agent conversation satisfies the confidence score threshold, the systems and methods may determine that the utterance belongs to the particular user-agent conversation, and include the utterance in the particular user-agent conversation.

Thus, as described above, the systems and methods may keep track of the utterances being spoken in the particular user-agent conversation. As a result, the particular user may communicate with the voice agent system in the particular user-agent conversation without repeating the trigger word after the particular user-agent conversation is established. As the systems and methods eliminate the need for the particular user to repeat the trigger word in each utterance spoken by the particular user to the voice agent system, the systems and methods may provide natural experience for the particular user when the particular user interacts with the voice agent system. As the systems and methods may keep track of the utterances being spoken in each user-agent conversation among the plurality of user-agent conversations, the voice agent system 300 may monitor each user-agent conversation individually.

In addition, the systems and methods may only perform a candidate action indicated in an utterance when the systems and methods are sufficiently confident that the utterance is spoken by a particular user to the voice agent system in a particular user-agent conversation of the particular user among the plurality of user-agent conversations. Thus, the systems and methods may be responsive only to utterances that are spoken by the plurality of users to the voice agent system in the plurality of user-agent conversations, and may disregard utterances in other conversations that continue simultaneously with the plurality of user-agent conversations in the same physical area. Accordingly, the utterances in the other conversations may not trigger the systems and methods to perform an unintentional action that is not requested by the plurality of users, and thus the operations of the systems and methods may not be impacted by the utterances in the other conversations. As a result, the systems and methods are advantageously applicable in industrial environments where the triggering of the unintentional action by the utterances in the other conversations is not allowed.

Moreover, as the operations of the systems and methods are not impacted by the utterances in the other conversations, the systems and methods may enable the particular user to participate in the particular user-agent conversation with the voice agent system and participate in other conversations at the same time. For example, the particular user may simultaneously participate in a first conversation between the particular user and the voice agent system, a second conversation between the particular user and a coworker, and a third conversation between the particular user and a remote technical support representative over the phone. Thus, the particular user may communicate with other people while working with the voice agent system on a given task. Accordingly, the systems and methods may facilitate the collaboration between the particular user and other people on the given task, and also provide natural experience for the particular user when the particular user interacts with the voice agent system.

Furthermore, the systems and methods may use the utterances in other conversations to process the utterances in the particular user-agent conversation. For example, the systems and methods may determine that an utterance is spoken by a person (e.g., a coworker) who has not initiated a user-agent conversation with the voice agent system, and therefore determine that the utterance does not belong to a user-agent conversation between a user and the voice agent system. The systems and methods may also determine that while the utterance does not belong to a user-agent conversation, the utterance content of the utterance is relevant to the topic of the particular user-agent conversation associated with the particular user. In this case, the systems and methods may store the utterance content of the utterance in association with the particular user-agent conversation, and use the utterance content of the utterance in processing future utterances in the particular user-agent conversation. For example, the systems and methods may use the utterance content of the utterance to infer missing information or ambiguous information in a subsequent utterance of the particular user-agent conversation at a later time. Thus, as the utterance content of the utterance in another conversation may be used as supplemental context in processing the utterance in the particular user-agent conversation, the accuracy in interpreting the utterance in the particular user-agent conversation may increase, and the confidence score associated with the utterance content of the utterance in the particular user-agent conversation may be improved.

Various illustrative embodiments will now be described in detail with reference to the figures. It should be understood that the illustrative embodiments described below are provided as examples and that other examples not explicitly described herein may also be captured by the scope of the claims set forth below. The systems and methods described herein may provide any of the benefits mentioned above, as well as various additional and/or alternative benefits that will be described and/or made apparent below.

FIG. 1 illustrates an example system 100 for managing data of one or more industrial automation systems. As depicted in FIG. 1, the system 100 may include a cloud platform 102 and one or more industrial facilities 104 of an industrial enterprise. The industrial facilities 104 may include one or more industrial devices 120 and one or more edge devices 130 as depicted in FIG. 1.

In some embodiments, the industrial devices 120 may perform various operations and/or functionalities within an industrial environment. Non-limiting examples of an industrial device 120 may include, but are not limited to, an industrial controller (e.g., programmable automation controller such as programmable logic controller (PLC), etc.), a field device (e.g., a sensor, a meter, an Internet of Things (IoT) device, etc.), a motion control device (e.g., a motor drive, etc.), an operator interface device (e.g., a human-machine interface device, an industrial monitor, a graphic terminal, a message display device, etc.), an industrial automated machine (e.g., an industrial robot, etc.), a lot control system (e.g., a barcode marker, a barcode reader, etc.), a vision system device (e.g., a vision camera, etc.), a safety relay, an optical safety system, and/or other types of industrial devices. In some embodiments, an industrial device 120 may be positioned at a fixed location within the industrial facility 104. Alternatively, the industrial device 120 may be part of a mobile control system such as a control system implemented in a truck or in a service vehicle.

In some embodiments, the industrial devices 120 in one or more industrial facilities 104 may form one or more industrial automation systems. Non-limiting examples of the industrial automation system may include, but are not limited to, a batch control system (e.g., a mixing system, etc.), a continuous control system (e.g., a proportional integral derivative (PID) control systems, etc.), a discrete control system, and/or other types of industrial automation systems. In some embodiments, the industrial automation system may perform one or more industrial processes that are related to product manufacturing, material handling, and/or other industrial operations within the industrial facilities 104.

In some embodiments, the industrial controllers in the industrial automation system may facilitate the monitoring and/or control of an industrial process performed by the industrial automation system. For example, the industrial controllers may communicate with the field devices using native hardwired I/O or via a plant network (e.g., Ethernet/IP, Data Highway Plus, ControlNet, DeviceNet, etc.) and receive digital and/or analog signals from the field devices. The received signals may indicate a current state of the field devices and/or a current state (e.g., a temperature, a position, a part presence or absence, a fluid level, etc.) of the industrial process performed by the industrial automation system. In some embodiments, the industrial controllers may execute a control program that performs automated decision-making for the industrial process based on the received signals. The industrial controllers may then output corresponding digital and/or analog control signals to the field devices in accordance with the decisions made by the control program. For example, the output signals may include a device actuation signal, a temperature control signal, a position control signal, an operational command to a machining or material handling robot, a mixer control signal, a motion control signal, and/or other types of output signals. In some embodiments, the control program may include any suitable type of code to process input signals provided to the industrial controller and to control output signals generated by the industrial controller. For example, the control program may include ladder logic, sequential function charts, function block diagrams, structured text, and/or other programming structures.

In some embodiments, the edge devices 130 may collect industrial data from the industrial devices 120 and/or from other data sources (e.g., a local data store, an on-premises processing system, etc.) and transmit the data to the cloud platform 102 for storage and/or processing. For example, the edge devices 130 may collect the data from the industrial devices 120 and/or from other data sources at a predefined interval (e.g., every 3 s) and transmit the collected data to the cloud platform 102. In some embodiments, an edge device 130 may be located within an industrial facility 104 as an on-premises device that facilitates data communication between the industrial devices 120 in the industrial facility 104 and the cloud platform 102.

In some embodiments, the cloud platform 102 may provide various cloud-based services for the industrial automation systems implemented in the industrial facilities 104 of the industrial enterprise. As depicted in FIG. 1, non-limiting examples of the cloud-based services may include, but are not limited to, data storage, visualization, data analytics, reporting, supervisory control, and/or other types of cloud-based services. In some embodiments, the cloud platform 102 may be a public cloud in which the cloud-based services are provided by a cloud service provider and accessible through a public network (e.g., the Internet) upon subscription to the cloud-based services. Alternatively, the cloud platform 102 may be a semi-private cloud in a shared cloud environment or in a corporate cloud environment. Alternatively, the cloud platform 102 may be a private cloud that is operated internally by the industrial enterprise. For example, the private cloud may include one or more computing devices (e.g., physical or virtual servers) that host the cloud-based services and reside within a corporate network protected by a firewall.

In some embodiments, the cloud platform 102 may implement one or more applications and/or storage systems to provide the cloud-based services. For example, the cloud platform 102 may implement a cloud storage system 140 to which data may be ingested for data storage and data analytics. As another example, the cloud platform 102 may implement a control application that performs remote decision-making for an industrial automation system. The control application may generate one or more control commands based on real-time data that is collected from the industrial automation system and transmitted to the cloud platform 102, and issue the control commands to the industrial automation system. As another example, the cloud platform 102 may implement a lot control application that tracks a product unit throughout various stages of production and collects production data (e.g., a barcode identifier, an abnormal flag, production statistics, quality test data, etc.) as the product unit passes through each stage. The cloud platform 102 may also implement a visualization application (e.g., a cloud-based Human Machine Interface (HMI)), a reporting application, an Enterprise Resource Planning (ERP) application, and/or other applications to provide corresponding cloud-based services to one or more industrial automation systems implemented by the industrial enterprise.

In some embodiments, the cloud-based services provided by the cloud platform 102 may facilitate various operations of the industrial automation systems implemented by the industrial enterprise. For example, the cloud-based storage provided by the cloud platform 102 may be dynamically scaled to accommodate a massive amount of data continuously generated by the industrial devices 120 of the industrial automation systems. As another example, the industrial facilities 104 that are located at different geographical locations may transmit data generated by their industrial automation systems to the cloud platform 102 for aggregation, collective analysis, visualization, and/or enterprise-level reporting without the need to establish one or more private networks between the industrial facilities 104. As another example, a diagnostic application implemented on the cloud platform 102 may monitor a working condition of various industrial automation systems and/or various industrial devices 120 included in the industrial automation systems across a particular industrial facility 104, or across multiple industrial facilities 104 of the industrial enterprise. In some embodiments, the cloud platform 102 may also provide software as a service, thereby alleviating the burden of software maintenance, software upgrade, and/or software backup for various software applications implemented in the industrial automation systems.

Figure 2:
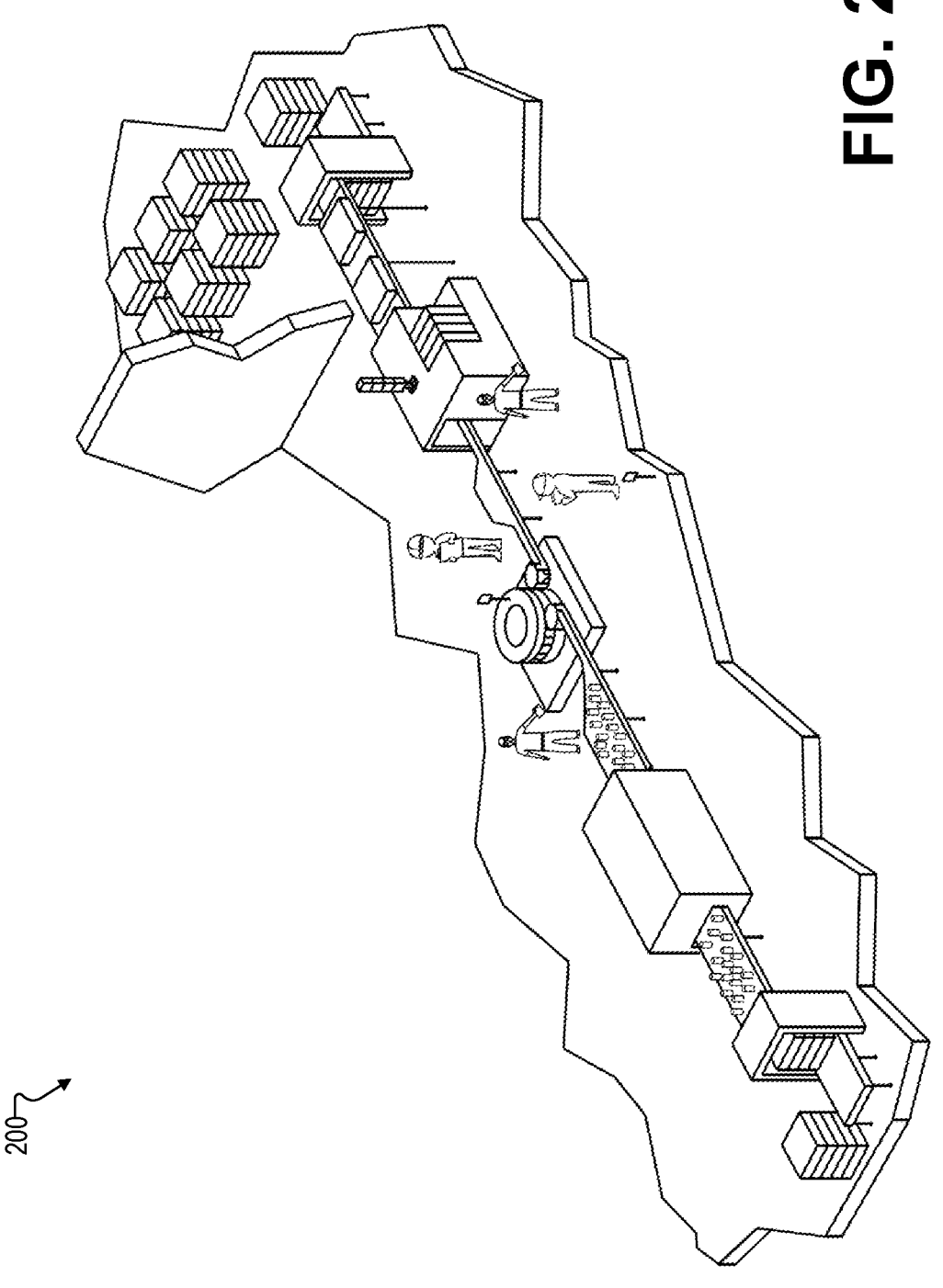
FIG. 2 illustrates an example physical area within an industrial facility.

FIG. 2 illustrates an example physical area 200 in an industrial facility 104. The industrial facility 104 may include the industrial devices 120 that form one or more industrial automation systems as described above. In some embodiments, the industrial facility 104 may also include one or more spatial microphones and one or more spatial cameras positioned at predefined locations in the industrial facility 104. A spatial microphone may capture utterances being spoken at an area in the industrial facility 104 that is within its range of coverage. Similarly, a spatial camera may capture videos and/or images of an area in the industrial facility 104 that is within its field of view. In some embodiments, the spatial camera may include one or more camera sensors and may be configured to obtain various information (e.g., depth information, location information, orientation information, etc.) of one or more objects within its field of view that are captured by the spatial camera in the videos and/or images of the area. It should be understood that the industrial facility 104 may also include other types of device that can be used to obtain various contexts (e.g., utterance contexts, conversation contexts, etc.) of one or more utterances and/or one or more conversations in one or more physical areas of the industrial facility 104.

As depicted in FIG. 2, the physical area 200 of the industrial facility 104 may include multiple users. In this present disclosure, the term "user" may refer to a person in general, and a user may or may not use or interact the voice agent system described herein. In some embodiments, a user at the physical area 200 may participate in one or more conversations simultaneously. For example, a first user may be working with a second user on an industrial automation system at the physical area 200. The first user may participate in a first conversation between the first user and the second user, a second conversation between the first user and a remote technical support representative via a user device (e.g., a mobile work phone) of the first user, and a third conversation between the first user and a voice agent system. The second user may participate in the first conversation between the first user and the second user and also participate in a fourth conversation between the second user and the voice agent system. A third user may walk by the physical area 200 and start a fifth conversation with both the first user and the second user. In this example, the first conversation, the second conversation, the third conversation, the fourth conversation, and the fifth conversation may be initiated at the same time or may be initiated at different time. However, these conversations may continue simultaneously in the physical area 200 in which the durations of these conversations may overlap and each conversation may include at least one user at the physical area 200 participating in the conversation.

In some embodiments, the physical area 200 may include one or more audio capturing devices (e.g., throat microphones, spatial microphones, etc.) located at the physical area 200 and these audio capturing devices may capture an audio stream associated with the physical area 200. In some embodiments, the audio stream associated with the physical area 200 may include utterances in a plurality of conversations that continue simultaneously in the physical area 200. In the example above, the audio stream associated with the physical area 200 may include the utterances in 5 simultaneous conversations. Accordingly, the audio stream associated with the physical area 200 may include the utterances spoken by the first user and the second user in the first conversation, in which the first user and the second user are both present at the physical area 200. In addition, the audio stream associated with the physical area 200 may include the utterances spoken by the first user and the remote technical support representative in the second conversation, in which the first user is present at the physical area 200 and the remote technical support representative is located remotely from the physical area 200 and communicates with the first user via an electronic device (e.g., a laptop) in the second conversation. Similarly, the audio stream associated with the physical area 200 may include the utterances spoken by the first user in the third conversation, the utterances spoken by the second user in the fourth conversation, and the utterances spoken by the first user, the second user, and the third user in the fifth conversation, in which the first user, the second user, and the third user are all present at the physical area 200. The audio stream associated with the physical area 200 may also include the utterances spoken by the voice agent system in the third conversation with the first user and in the fourth conversation with the second user.

As described above, the utterances in the audio stream associated with the physical area 200 may be captured by one or more audio capturing devices located at the physical area 200. Non-limiting examples of the audio capturing devices located at the physical area 200 include, but are not limited to, a spatial microphone positioned at the physical area 200, a throat microphone being worn by a user at the physical area 200, a user device such as an electronic device (e.g., a mobile phone, a laptop, a tablet, etc.) being used by a user at the physical area 200 to communicate with a user located remotely from the physical area 200, etc. In some embodiments, an utterance in the audio stream associated with the physical area 200 may be captured by one audio capturing device located at the physical area 200 or may be captured by multiple audio capturing devices located at the physical area 200. For example, an utterance spoken by the remote technical support representative in the second conversation may be captured only by the user device (e.g., the mobile work phone) of the first user at the physical area 200. On the other hand, an utterance spoken by the first user in the second conversation may be captured by the user device (e.g., the mobile work phone) of the first user at the physical area 200, the throat microphone being worn by the first user at the physical area 200, and the spatial microphones positioned at the physical area 200.

Figure 3:
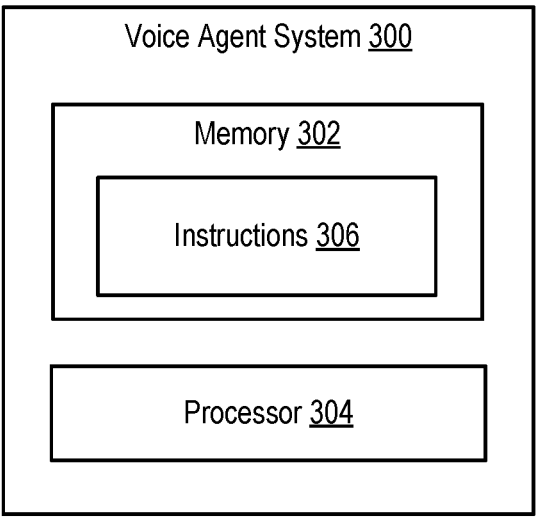
FIG. 3 illustrates an example voice agent system.

Thus, as described above, the audio stream associated with the physical area 200 may include the utterances in multiple conversations that continue simultaneously in the physical area 200. Therefore, it is challenging for a voice agent system to determine whether an utterance in the audio stream associated with the physical area 200 is spoken to the voice agent system by a user who is interacting with the voice agent system. FIG. 3 illustrates an example voice agent system 300 for determining whether an utterance belongs to a user-agent conversation among a plurality of user-agent conversations associated with a plurality of users, in which the plurality of users respectively interact with the voice agent system 300 in the plurality of user-agent conversations. For example, the voice agent system 300 may determine that the utterance potentially belongs to a particular user-agent conversation of a particular user and determine a confidence score that the utterance belongs to the particular user-agent conversation. Based on the confidence score that the utterance belongs to the particular user-agent conversation and based on other factors, the voice agent system 300 may determine whether the particular user associated with the particular user-agent conversation requests the voice agent system 300 to perform an action in the particular user-agent conversation using the utterance. The voice agent system 300 may then perform the action indicated in the utterance or ignore the utterance accordingly.

In some embodiments, the voice agent system 300 may be implemented by computing resources such as servers, processors, memory devices, storage devices, communication interfaces, and/or other computing resources. In some embodiments, the voice agent system 300 may be implemented at the industrial device 120, the edge device 130, the cloud platform 102, and/or other components of the system 100. In some embodiments, various components of the system 100 may collaborate with one another to perform one or more functionalities of the voice agent system 300 described herein. In some embodiments, the voice agent system 300 may include a voice agent application running on an industrial device 120, an edge device 130, and/or a user device (e.g., a mobile phone, a tablet, a laptop, a computer, etc.). In some embodiments, a user may interact with the voice agent system 300 via the voice agent application.

As depicted in FIG. 3, the voice agent system 300 may include, without limitation, a memory 302 and a processor 304 communicatively coupled to one another. The memory 302 and the processor 304 may each include or be implemented by computer hardware that is configured to store and/or execute computer software. Other components of computer hardware and/or software not explicitly shown in FIG. 3 may also be included within the voice agent system 300. In some embodiments, the memory 302 and the processor 304 may be distributed between multiple devices and/or multiple locations as may serve a particular implementation.

The memory 302 may store and/or otherwise maintain executable data used by the processor 304 to perform one or more functionalities of the voice agent system 300 described herein. For example, the memory 302 may store instructions 306 that may be executed by the processor 304. In some embodiments, the memory 302 may be implemented by one or more memory or storage devices, including any memory or storage devices described herein, that are configured to store data in a transitory or non-transitory manner. In some embodiments, the instructions 306 may be executed by the processor 304 to cause the voice agent system 300 to perform one or more functionalities described herein. The instructions 306 may be implemented by any suitable application, software, code, and/or other executable data instance. Additionally, the memory 302 may also maintain any other data accessed, managed, used, and/or transmitted by the processor 304 in a particular implementation.

The processor 304 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. The voice agent system 300 may use the processor 304 (e.g., when the processor 304 is directed to perform operations represented by instructions 306 stored in the memory 302) and perform various functionalities associated with managing a plurality of user-agent conversations, processing an utterance, and/or performing other operations in any manner described herein or as may serve a particular implementation.

In some embodiments, the voice agent system 300 may be communicatively coupled to various components and devices associated with the industrial facility 104. For example, the voice agent system 300 may be communicatively coupled to the spatial cameras and the spatial microphones in the industrial facility 104, and therefore the voice agent system 300 may obtain the videos/images captured by the spatial cameras and the utterances captured by the spatial microphones. In some embodiments, the voice agent system 300 may also be communicatively coupled to the throat microphones being used by the users in the industrial facility 104, and therefore the voice agent system 300 may obtain the utterances captured by the throat microphones.

Additionally or alternatively, the voice agent system 300 may be communicatively coupled to one or more user devices (e.g., work phones, work laptops, etc.) of one or more users in the industrial facility 104. Therefore, the voice agent system 300 may access a user device of a user in the industrial facility 104, and obtain the utterances spoken in a conversation in which the user participates via the user device. The voice agent system 300 may also obtain the device location of the user device and/or other information from the user device.

Additionally or alternatively, the voice agent system 300 may be communicatively coupled to a device information database associated with the industrial facility 104, and therefore the voice agent system 300 may obtain various device information of the industrial devices 120 in the industrial facility 104 from the device information database. In some embodiments, the device information of an industrial device 120 may indicate the device location at which the industrial device 120 is located, the device components and the device configurations of the industrial device 120, the device functionalities that are available on the industrial device 120, the operation status of the industrial device 120 (e.g., the on-off state, the operation mode, the operation parameters, the error notifications, etc.), etc. Other types of device information of the industrial device 120 are also possible and contemplated.

In some embodiments, the device information database may also include device information (e.g., the device location, the device configuration, etc.) of the spatial cameras and the spatial microphones located within the industrial facility 104. In some embodiments, the device information database may also include device information of the throat microphones being used by the users in the industrial facility 104. The device information of each throat microphone may specify the user who currently uses the throat microphone, the device configuration of the throat microphone, etc.

Additionally or alternatively, the voice agent system 300 may be communicatively coupled to various industrial devices 120 in the industrial facility 104 via an industrial network or a plant network, and therefore the voice agent system 300 may communicate with the industrial devices 120 and/or control the industrial devices 120 to perform various operations.

FIG. 4 illustrates an example utterance processing method 400 (e.g., the method 400) that may be performed by a voice agent system to process an utterance in an audio stream associated with a physical area. While FIG. 4 shows illustrative operations according to one embodiment, other embodiments may omit, add to, reorder, and/or modify any of the operations shown in FIG. 4. In some examples, multiple operations shown in FIG. 4 or described in relation to FIG. 4 may be performed concurrently (e.g., in parallel) with one another, rather than being performed sequentially as illustrated and/or described. One or more of the operations shown in FIG. 4 may be performed by the voice agent system such as the voice agent system 300 and/or any implementation thereof. Additionally or alternatively, one or more of the operations shown in FIG. 4 and/or other operations described herein may be performed by a computing system communicatively coupled to the voice agent system 300. For example, the computing system may receive an input from the voice agent system 300, perform one or more operations described herein using the input, and provide a corresponding output to the voice agent system 300. The method 400 is described below in the context of the physical area 200 of the industrial facility 104 as an example. However, it should be understood that the method 400 may also be used to process the utterances of the conversations in other environments.

At operation 402, the voice agent system 300 may establish a plurality of user-agent conversations. Each user-agent conversation may be a conversation between a user who is present at the physical area 200 and the voice agent system 300 and may be established in response to the user speaking a trigger word associated with the voice agent system 300. For example, the user may speak an utterance including the trigger word of the voice agent system 300 (e.g., "Hey, ABAI" in which "ABAI" is an abbreviation for "Allen-Bradley Artificial Intelligence") to initiate a conversation between the user and the voice agent system 300. In response to such initiation, when detecting the utterance including the trigger word, the voice agent system 300 may identify the user based on the utterance and authenticate the user. If the user is successfully authenticated, the voice agent system 300 may establish a user-agent conversation between the user and the voice agent system 300.

In some embodiments, the voice agent system 300 may also monitor the plurality of user-agent conversations respectively initiated by a plurality of users at the physical area 200. For example, for each user-agent conversation among the plurality of user-agent conversations, the voice agent system 300 may determine utterances that belong to the user-agent conversation, and include the utterances in the user-agent conversation. Accordingly, the voice agent system 300 may keep track of the utterances being spoken in the user-agent conversation. While the plurality of user-agent conversations may be initiated at the same time or at different time, these user-agent conversations may continue simultaneously in the physical area 200, in which the durations of these user-agent conversations may overlap and the plurality of users may participate in their corresponding user-agent conversation while being at the physical area 200. In this present disclosure, the user-agent conversations that continue simultaneously in the physical area 200 may be referred to as the user-agent conversations associated with the physical area 200 or the user-agent conversations in the physical area 200.

At operation 404, the voice agent system 300 may detect an utterance in an audio stream associated with the physical area 200. As described herein, the utterances in the audio stream associated with the physical area 200 may be captured by one or more audio capturing devices (e.g., throat microphone, spatial microphones, electronic devices such as mobile phones, etc.) that are located at the physical area 200. As described herein, the audio stream associated with the physical area 200 may include the utterances in multiple conversations that continue simultaneously in the physical area 200. For example, the audio stream associated with the physical area 200 may include the utterances in the plurality of user-agent conversations that are initiated with the voice agent system 300 by the plurality of users at the physical area 200, the utterances in a conversation between two or more users who are present at the physical area 200, and/or the utterances in a conversation between a user who is present at the physical area 200 and a user who is located remotely from the physical area 200 via an electronic device (e.g., a mobile phone), etc. Thus, the audio stream associated with the physical area 200 may include a mixture of utterances in various conversations that continue simultaneously in the physical area 200, in which the durations of these conversations may overlap and each conversation may include at least one user at the physical area 200 participating in the conversation. In this present disclosure, the conversations that continue simultaneously in the physical area 200 may be referred to as the conversations associated with the physical area 200 or the conversations in the physical area 200.

At operation 406, based on the utterance, the voice agent system 300 may determine that the utterance potentially belongs to a particular user-agent conversation among the plurality of user-agent conversations. For example, the voice agent system 300 may determine a voice signature of the utterance, and determine that the voice signature of the utterance matches a voice signature profile associated with the particular user-agent conversation of a particular user. Accordingly, the voice agent system 300 may determine that the utterance potentially belongs to the particular user-agent conversation. In some embodiments, the voice agent system 300 may determine a confidence score that the utterance belongs to the particular user-agent conversation. The confidence score that the utterance belongs to the particular user-agent conversation may indicate a level at which the voice agent system 300 is confident that the utterance is spoken by the particular user to the voice agent system 300 in the particular user-agent conversation, in which the particular user-agent conversation may be established in response to the particular user speaking the trigger word (e.g., "Hey, ABAI") to initiate a conversation with the voice agent system 300 as described herein. In some embodiments, the confidence score may be determined based on one or more utterance contexts (e.g., the voice signature, the utterance content, the user orientation, etc.) associated with the utterance and one or more conversation contexts (e.g., the voice signature profile, the topic, the user location, etc.) associated with the particular user-agent conversation.

At operation 408, the voice agent system 300 may identify a candidate action to be performed by the voice agent system 300 based on the utterance in the audio stream associated with the physical area 200. For example, the voice agent system 300 may perform a speech recognition operation on the utterance to determine an utterance content of the utterance. The utterance content of the utterance may indicate one or more words that were spoken to form the utterance. The voice agent system 300 may then identify a command word in the utterance content of the utterance, and determine the candidate action indicated in the utterance based on the command word.

At operation 410, the voice agent system 300 may determine an overall confidence score of the candidate action based on the confidence score that the utterance belongs to the particular user-agent conversation and based on other factors (e.g., the user location of the particular user associated with the particular user-agent conversation, the device information of an industrial device associated with the utterance, the emotional distress level of the utterance, etc.). The overall confidence score may indicate a level at which the voice agent system 300 is confident that the voice agent system 300 is requested to perform the candidate action by the particular user when the utterance is spoken by the particular user in the particular user-agent conversation.

At operation 412, the voice agent system 300 may perform an operation based on the overall confidence score of the candidate action. For example, the voice agent system 300 may determine that the overall confidence score of the candidate action satisfies a first overall confidence score threshold (e.g., the overall confidence score≥80%). In this case, the voice agent system 300 may perform the candidate action. Alternatively, the voice agent system 300 may determine that the overall confidence score of the candidate action does not satisfies a second overall confidence score threshold (e.g., the overall confidence score<10%). In this case, the voice agent system 300 may ignore the utterance without performing the candidate action determined from the utterance. Alternatively, the voice agent system 300 may determine that the overall confidence score of the candidate action satisfies the second overall confidence score threshold and does not satisfy the first overall confidence score threshold (e.g., 10%≤the overall confidence score<80%). In this case, the voice agent system 300 may request a user confirmation of the candidate action from the particular user associated with the particular user-agent conversation. Based on the user confirmation of the candidate action provided by the particular user, the voice agent system 300 may or may not perform the candidate action accordingly.

Thus, the voice agent system 300 may perform the utterance processing for an utterance in the audio stream associated with the physical area 200. As described above, to perform the utterance processing, the voice agent system 300 may establish and monitor the plurality of user-agent conversations respectively initiated by the plurality of users at the physical area 200. Each user-agent conversation may be one of multiple conversations that continue simultaneously in the physical area 200, and therefore the utterances in the user-agent conversation may be included in the audio stream associated with the physical area 200 together with the utterances in other conversations that continue simultaneously with the user-agent conversation in the physical area 200.

As described herein, each user-agent conversation between a user and the voice agent system 300 may be initiated by the user. For example, the user may speak an utterance including the trigger word of the voice agent system 300 (e.g., "Hey, ABAI") to initiate the user-agent conversation between the user and the voice agent system 300. When the voice agent system 300 detects the utterance including the trigger word spoken by the user, the voice agent system 300 may identify the user based on the utterance and authenticate the user. After the user is successfully authenticated, the voice agent system 300 may establish or create the user-agent conversation between the user and the voice agent system 300. In some embodiments, after the user-agent conversation between the user and the voice agent system 300 is established or created, the user-agent conversation between the user and the voice agent system 300 may be monitored by the voice agent system 300 and may be considered active until it is terminated. In some embodiments, the voice agent system 300 may terminate the user-agent conversation between the user and the voice agent system 300 in response to a user request of the user to end the user-agent conversation between the user and the voice agent system 300 and/or in response to the user not communicating with the voice agent system 300 in an extended time period (e.g., more than 15 minutes).

In some embodiments, the voice agent system 300 may be responsive only to the utterances spoken by a user who has a user-agent conversation between the user and the voice agent system 300 being established previously and the user-agent conversation of the user is currently active. For example, the voice agent system 300 may provide an utterance in response to an utterance of the user, perform an action indicated in the utterance of the user, etc. However, the voice agent system 300 may not be responsive to every utterance spoken by the user. Instead, the voice agent system 300 may be responsive only to the utterances spoken by the user in the user-agent conversation between the user and the voice agent system 300, and may disregard or ignore the utterances spoken by the user in other conversations (e.g., a conversation between the user and one or more other users). On the other hand, the voice agent system 300 may disregard or ignore all utterances spoken by a different user who does not have a user-agent conversation between the different user and the voice agent system 300 being established previously or the user-agent conversation of the different user is no longer active. For example, the voice agent system 300 may not provide an utterance in response to an utterance of the different user and may not perform an action indicated in the utterance of the different user, etc.

Accordingly, in order to communicate and interact with the voice agent system 300, a user may first initiate a user-agent conversation between the user and the voice agent system 300 by speaking an utterance including the trigger word of the voice agent system 300 (e.g., "Hey, ABAI"). In response to such initiation, when detecting the utterance including the trigger word, the voice agent system 300 may identify the user based on the utterance and authenticate the user. After the user is successfully authenticated, the voice agent system 300 may establish the user-agent conversation between the user and the voice agent system 300. The voice agent system 300 may also monitor the user-agent conversation between the user and the voice agent system 300. For example, the voice agent system 300 may keep track of the utterances being spoken in the user-agent conversation between the user and the voice agent system 300. Accordingly, after the user-agent conversation between the user and the voice agent system 300 is established, the user may communicate with the voice agent system 300 in the user-agent conversation without including the trigger word in the utterances spoken by the user to the voice agent system 300.

To illustrate, when the voice agent system 300 detects an utterance in the audio stream associated with the physical area 200, the voice agent system 300 may perform a speech-to-text conversion on the utterance to determine a textual representation of the utterance. The utterance in the textual format and/or the utterance in the audio format may then be used in one or more processing operations performed by the voice agent system 300 described herein.

In some embodiments, when an utterance is detected in the audio stream associated with the physical area 200, the voice agent system 300 may determine whether the utterance includes the trigger word of the voice agent system 300 (e.g., "Hey, ABAI"). For example, the voice agent system 300 may perform a speech recognition operation on the utterance to determine an utterance content of the utterance. As described herein, the utterance content of the utterance may indicate one or more words that were spoken to form the utterance. The voice agent system 300 may analyze the utterance content of the utterance, and determine whether the utterance includes the trigger word (e.g., "Hey, ABAI"). If the utterance includes the trigger word, the voice agent system 300 may establish a user-agent conversation based on the utterance.

In some embodiments, to establish the user-agent conversation based on the utterance including the trigger word, the voice agent system 300 may identify a user who speaks the utterance. For example, the voice agent system 300 may perform a voice recognition operation on the utterance that includes the trigger word to determine a voice signature of the utterance. The voice signature of the utterance may describe various aspects (e.g., talking speed, frequency, amplitude, etc.) of a human voice in which the utterance is spoken. In some embodiments, the voice agent system 300 may compare the voice signature of the utterance to various voice signature profiles of various users in a voice signature profile database. Each voice signature profile may be associated with a user and may describe various aspects (e.g., talking speed, frequency, amplitude, etc.) of a human voice in which the user speaks. In some embodiments, based on the comparison between the voice signature of the utterance and the voice signature profiles in the voice signature profile database, the voice agent system 300 may identify a particular voice signature profile that matches the voice signature of the utterance, and determine the user who speaks the utterance to be the user associated with the particular voice signature profile.

Additionally or alternatively, the voice agent system 300 may determine that the utterance including the trigger word is obtained from a particular throat microphone. In this case, the voice agent system 300 may reference the device information database to identify a user who currently uses the particular throat microphone, and determine the user who speaks the utterance to be the user who currently uses the particular throat microphone that captures the utterance.

Additionally or alternatively, the voice agent system 300 may determine that the utterance including the trigger word is obtained from multiple spatial microphones in the industrial facility 104. In this case, the voice agent system 300 may reference the device information database to obtain the device locations of the spatial microphones that capture the utterance. The voice agent system 300 may then apply a triangulation operation to the device locations of these spatial microphones to determine a source location of the utterance at which the utterance is spoken. After the source location of the utterance is determined, the voice agent system 300 may identify one or more spatial cameras that capture the area including the source location of the utterance, and obtain one or more images of the area that are captured by these spatial cameras at the utterance timestamp of the utterance. The voice agent system 300 may then perform facial recognition operations on the one or more images to identify the user who is present at the source location of the utterance at the time the utterance is spoken as depicted in the one or more images, and determine the user who speaks the utterance to be the identified user.

In some embodiments, after the user who speaks the utterance including the trigger word is identified, the user may be subjected to an authentication operation. For example, the voice agent system 300 may request the user to provide login information of the user to verify a user identity of the user and also verify that the user is authorized to request information of the industrial devices 120 in the industrial facility 104 and/or to request one or more operations be performed on the industrial devices 120 of the industrial facility 104. Additionally or alternatively, the voice agent system 300 may request the user to speak an utterance including a particular phrase that facilitates the determination of voice signature and allows the voice signature to be accurately determined. The voice agent system 300 may then determine a voice signature of the utterance including the particular phrase that is spoken by the user, and compare the voice signature of the utterance to the voice signature profiles of various users in the voice signature profile database. Based on such comparison, the voice agent system 300 may identify a particular voice signature profile that matches the voice signature of the utterance, and determine the user who speaks the utterance to be the user associated with the particular voice signature profile. Accordingly, the voice agent system 300 may verify the user identity of the user with a high level of accuracy based on the utterance including the particular phrase spoken by the user. Additionally or alternatively, the voice agent system 300 may verify the user identity of the user based on voice biometrics and/or voice authentication. In some embodiments, after the user identity of the user is verified, the voice agent system 300 may reference a user profile of the user to verify that the user is authorized to request information of the industrial devices 120 in the industrial facility 104 and/or to request one or more operations be performed on the industrial devices 120 of the industrial facility 104. Other implementations to authenticate the user are also possible and contemplated.

In some embodiments, after the user is successfully authenticated, the voice agent system 300 may establish or create a user-agent conversation between the user and the voice agent system 300. When establishing the user-agent conversation between the user and the voice agent system 300, the voice agent system 300 may initiate or create a conversation instance corresponding to the user-agent conversation between the user and the voice agent system 300 and store the conversation instance corresponding to the user-agent conversation between the user and the voice agent system 300 in a storage device of the voice agent system 300. In some embodiments, the voice agent system 300 may associate the voice signature profile of the user with the user-agent conversation between the user and the voice agent system 300. The user-agent conversation between the user and the voice agent system 300 may be referred to herein as the user-agent conversation of the user or the user-agent conversation associated with the user. In some embodiments, the voice agent system 300 may monitor the user-agent conversation of the user. For example, the voice agent system 300 may determine one or more utterances in the audio stream associated with the physical area 200 that are spoken by the user to the voice agent system 300 as described herein, and include these utterances in the user-agent conversation of the user (e.g., the voice agent system 300 may include these utterances in the conversation instance corresponding to the user-agent conversation of the user that is stored in the storage device of the voice agent system 300). In some embodiments, the user-agent conversation of the user may include one or more utterances spoken by the user to the voice agent system 300 and one or more utterances spoken by the voice agent system 300 to the user that are arranged in the chronological order of the utterance timestamps at which the utterances are spoken.

In some embodiments, the voice agent system 300 may determine one or more conversation contexts associated with the user-agent conversation of the user. Non-limiting examples of the conversation contexts associated with the user-agent conversation of the user include, but are not limited to, the voice signature profile of the user, the topic of the user-agent conversation of the user, the user location of the user during the user-agent conversation of the user, the industrial devices 120 located proximate to the user during the user-agent conversation of the user, etc. Other conversation contexts associated with the user-agent conversation of the user are also possible and contemplated.

In some embodiments, the voice agent system 300 may determine the conversation contexts associated with the user-agent conversation of the user based on information from various data sources such as the spatial cameras, the spatial microphones, the user device of the user, the device information database, a storage device of the voice agent system 300 (e.g., a local data storage and/or the cloud storage system 140), etc.

For example, to determine the topic of the user-agent conversation of the user, the voice agent system 300 may obtain the utterances in the user-agent conversation of the user that are stored in the conversation instance corresponding to the user-agent conversation of the user in the storage device of the voice agent system 300. The voice agent system 300 may determine the utterance contents of the utterances in the user-agent conversation of the user, and determine the topic of the user-agent conversation of the user to be the subject matter that the user and the voice agent system 300 communicate in these utterances.

As another example, the voice agent system 300 may determine the user location of the user during the user-agent conversation of the user. The user location of the user during the user-agent conversation of the user may be referred to herein as the user location of the user for simplification. In some embodiments, the user may carry the user device (e.g., the mobile work phone) with the user. In this case, the voice agent system 300 may obtain the device location from the user device of the user during the user-agent conversation of the user, and determine the user location of the user to be the device location of the user device.

Additionally or alternatively, the voice agent system 300 may determine that an utterance spoken by the user during the user-agent conversation of the user is obtained from multiple spatial microphones in the industrial facility 104. In this case, the voice agent system 300 may reference the device information database to obtain the device locations of the spatial microphones that capture the utterance. The voice agent system 300 may then apply a triangulation operation to the device locations of these spatial microphones to identify a source location of the utterance at which the utterance is spoken, and determine the user location of the user to be the source location of the utterance spoken by the user.

Additionally or alternatively, the voice agent system 300 may obtain the images captured by various spatial cameras in the industrial facility 104 during the user-agent conversation of the user. The voice agent system 300 may perform facial recognition operations on these images to detect the user in one or more images. In some embodiments, the voice agent system 300 may analyze the one or more images, and determine the user location at which the user is present as depicted in the one or more images. Alternatively, the voice agent system 300 may identify the spatial cameras that capture the one or more images in which the user is depicted. The voice agent system 300 may then reference the device information database to obtain the device locations of the spatial cameras that capture the one or more images, and determine the user location of the user based on the device locations of these spatial cameras.

Additionally or alternatively, the voice agent system 300 may request the user to provide the user location of the user. In this case, the voice agent system 300 may analyze an utterance spoken by the user in response to the request, and determine the user location of the user indicated in the utterance. Other implementations for determining the user location of the user during the user-agent conversation of the user are also possible and contemplated.

As another example, the voice agent system 300 may also determine the industrial devices 120 located proximate to the user during the user-agent conversation of the user. For example, the voice agent system 300 may reference the device information database to obtain the device locations of various industrial devices 120 in the industrial facility 104, and determine the industrial devices 120 that are located within a predefined distance (e.g., 5 m) from the user location of the user during the user-agent conversation of the user. In some embodiments, the user may likely communicate with the voice agent system 300 about one or more industrial devices 120 located proximate to the user as the user works on these industrial devices 120 and communicates with the voice agent system 300 at the same time for assistance.

Thus, the voice agent system 300 may establish the plurality of user-agent conversations, in which each user-agent conversation between a user and the voice agent system 300 may be established in response to the user speaking the trigger word (e.g., "Hey, ABAI") to initiate the user-agent conversation between the user and the voice agent system 300 as described above. Each user-agent conversation may be one of multiple conversations that continue simultaneously in the physical area 200, and therefore the utterances in the user-agent conversation may be included in the audio stream associated with the physical area 200 together with the utterances in other conversations that continue simultaneously with the user-agent conversation in the physical area 200. In some embodiments, for each utterance detected in the audio stream associated with the physical area 200, the voice agent system 300 may determine whether the utterance belongs to a user-agent conversation among the plurality of user-agent conversations in the physical area 200. For example, based on a voice signature of the utterance, the voice agent system 300 may determine that the utterance potentially belongs to a particular user-agent conversation of a particular user. The voice agent system 300 may determine a confidence score that the utterance belongs to the particular user-agent conversation. Based on the confidence score that the utterance belongs to the particular user-agent conversation and based on other factors, the voice agent system 300 may determine whether the particular user associated with the particular user-agent conversation requests the voice agent system 300 to perform a candidate action indicated in the utterance.

To illustrate, when detecting the utterance in the audio stream associated with the physical area 200, the voice agent system 300 may perform a speech-to-text conversion on the utterance to determine a textual representation of the utterance. The utterance in the textual format and/or the utterance in the audio format may then be used in one or more processing operations performed by the voice agent system 300 described herein.

In some embodiments, the voice agent system 300 may determine a voice signature of the utterance. For example, the voice agent system 300 may perform a voice recognition operation on the utterance to determine the voice signature of the utterance. As described herein, the voice signature of the utterance may describe various aspects (e.g., talking speed, frequency, amplitude, etc.) of a human voice in which the utterance is spoken. In some embodiments, the voice agent system 300 may compare the voice signature of the utterance to the plurality of voice signature profiles associated with the plurality of user-agent conversations. In some embodiments, if the voice signature of the utterance does not match any voice signature profile among the voice signature profiles associated with the plurality of user-agent conversations, the voice agent system 300 may determine that the utterance is not spoken by the plurality of users associated with the plurality of user-agent conversations, but instead spoken by a user who does not interact with the voice agent system 300 in a user-agent conversation that the voice agent system 300 currently monitors. As a result, the voice agent system 300 may ignore the utterance and may not perform an action indicated in the utterance.

On the other hand, if the voice signature of the utterance matches a voice signature profile associated with a particular user-agent conversation of a particular user among the plurality of user-agent conversations, the voice agent system 300 may determine that the utterance is spoken by the particular user who interacts with the voice agent system 300 in the particular user-agent conversation that the voice agent system 300 currently monitors, and therefore determine that the utterance may potentially belong to the particular user-agent conversation between the particular user and the voice agent system 300. Alternatively, the utterance may not belong to the particular user-agent conversation between the particular user and the voice agent system 300 but belong to another conversation of the particular user that continues simultaneously with the particular user-agent conversation. In some embodiments, the voice agent system 300 may determine that the utterance is spoken by the particular user who participates in the particular user-agent conversation with a first confidence score. The first confidence score may indicate a matching level at which the voice signature of the utterance matches the voice signature profile of the particular user that is associated with the particular user-agent conversation. Accordingly, the first confidence score may indicate a level at which the voice agent system 300 is confident that the utterance is spoken by the particular user who is associated with the particular user-agent conversation.

In some embodiments, in addition to the voice signature of the utterance, the voice agent system 300 may determine an utterance content of the utterance. For example, the voice agent system 300 may perform a speech recognition operation on the utterance to determine the utterance content of the utterance. As described herein, the utterance content of the utterance may indicate one or more words that were spoken to form the utterance. As an example, the voice agent system 300 may perform a speech recognition operation such as a Natural Language Processing (NLP) operation on the utterance, and determine that the utterance content of the utterance is "Switch Drive 3 to closed loop." In some embodiments, the voice agent system 300 may determine the utterance content of the utterance with a confidence score that indicates a level at which the voice agent system

300 is confident about the utterance content of the utterance. This confidence score may be provided by the speech recognition operation performed on the utterance as an output together with the utterance content of the utterance and may be referred to herein as the confidence score associated with the utterance content of the utterance or the confidence score of the utterance content of the utterance.

In some embodiments, the voice agent system 300 may use one or more additional contexts in determining the utterance content of the utterance. For example, due to various noise in the physical area 200, the utterance captured by the spatial microphone may not be clear and the voice agent system 300 can only identify the words "s Drive 3" in the utterance. Accordingly, the voice agent system 300 may determine that the utterance content of the utterance may be "Start Drive 3" or "Stop Drive 3." In this case, the voice agent system 300 may obtain an operation status of Drive 3 from the device information database, and determine that Drive 3 is currently running when the utterance is spoken. Accordingly, the voice agent system 300 may determine that the utterance content of the utterance is "Stop Drive 3" and not "Start Drive 3" because Drive 3 is already started. Thus, by using the additional contexts in determining the utterance content of the utterance, the voice agent system 300 may determine the utterance content of the utterance with a higher level of accuracy. In some embodiments, the utterance, the additional contexts, and a user confirmation of a candidate action indicated in the utterance may be used in training a machine learning model to perform a speech recognition operation and determine an utterance content of an utterance and/or to determine a candidate action indicated in an utterance as described herein.

In some embodiments, the voice agent system 300 may identify a candidate action to be performed by the voice agent system 300 based on the utterance content of the utterance. For example, the voice agent system 300 may determine a command word in the utterance content of the utterance, and determine the candidate action to be performed by the voice agent system 300 based on the command word. As an example, the voice agent system 300 may determine that the utterance content of the utterance is "Switch Drive 3 to closed loop." In this case, the voice agent system 300 may determine that the command word is "switch," and therefore determine that the candidate action is to switch the control mode of the industrial device Drive 3 to the control mode "closed loop." As another example, the voice agent system 300 may determine that the utterance content of the utterance is "What is the dynamic brake resistor on PowerFlex 525?" In this case, the voice agent system 300 may determine that the command word is "what is," and therefore determine that the candidate action is to provide information about the dynamic brake resistor of the industrial device PowerFlex 525. As another example, the voice agent system 300 may determine that the utterance content of the utterance is "The stop by the goalie really saved the comeback by AC Milan." In this case, the voice agent system 300 may determine that the command word is "stop" and therefore determine that the candidate action is to stop an industrial device that is unspecified in the utterance.

In some embodiments, the voice agent system 300 may determine whether the utterance content of the utterance is relevant to a topic of the particular user-agent conversation. For example, the voice agent system 300 may determine that the utterance content of the utterance is relevant to the topic of the particular user-agent conversation with a second confidence score. The second confidence score may indicate a level at which the utterance content of the utterance is related to the topic of the particular user-agent conversation, and therefore the second confidence score may indicate a level that the utterance fits in the particular user-agent conversation of the particular user and not another conversation of the particular user who speaks the utterance as determined by the voice agent system 300.

As an example, the voice agent system 300 may determine that the utterance content of the utterance is "Switch Drive 3 to closed loop." In this case, the voice agent system 300 may determine that the utterance content of the utterance is related to the control mode of Drive 3, and the topic of the particular user-agent conversation between the particular user and the voice agent system 300 is also related to the operations of Drive 3. Accordingly, the voice agent system 300 may determine that the utterance content of the utterance is relevant to the topic of the particular user-agent conversation. Therefore, the voice agent system 300 may determine that the utterance content of the utterance is relevant to the topic of the particular user-agent conversation with a relatively high second confidence score (e.g., 85%).

As another example, the voice agent system 300 may determine that the utterance content of the utterance is "The stop by the goalie really saved the comeback by AC Milan." In this case, the voice agent system 300 may determine that the utterance content of the utterance is related to a soccer game, while the topic of the particular user-agent conversation between the particular user and the voice agent system 300 is related to the operations of Drive 3. Accordingly, the voice agent system 300 may determine that the utterance content of the utterance is not relevant to the topic of the particular user-agent conversation. Therefore, the voice agent system 300 may determine that the utterance content of the utterance is relevant to the topic of the particular user-agent conversation with a relatively low second confidence score (e.g., 10%).

In some embodiments, the voice agent system 300 may determine a user orientation of the particular user at the utterance timestamp of the utterance. For example, based on the user location of the particular user during the particular user-agent conversation, the voice agent system 300 may identify one or more spatial cameras in the industrial facility 104 that capture the area including the user location of the particular user. The voice agent system 300 may then obtain one or more images of the area that are captured by these spatial cameras at the utterance timestamp of the utterance. In some embodiments, the voice agent system 300 may perform facial recognition operations on the one or more images of the area to detect the particular user in the one or more images, and determine the user orientation of the particular user at the utterance timestamp of the utterance as depicted in the one or more images.

In some embodiments, based on the user orientation of the particular user relative to the positions of other people depicted in the one or more images, the voice agent system 300 may determine whether the particular user orientates towards a different person at the utterance timestamp of the utterance. For example, the voice agent system 300 may determine that the particular user orientates towards a different person at the utterance timestamp of the utterance with a third confidence score. The third confidence score may indicate a level at which the voice agent system 300 is confident that the particular user who speaks the utterance as determined by the voice agent system 300 is facing a different person at the utterance timestamp when the utterance is spoken. In some embodiments, if the particular user is facing a different person when the utterance is spoken, the utterance is likely spoken by the particular user to the should be understood that other types of contexts may also be used in determining the confidence score that the utterance belongs to the particular user-agent conversation. In some embodiments, the confidence score that the utterance belongs to the particular user-agent conversation may be considered one of the utterance contexts of the utterance.

In some embodiments, based on the confidence score that the utterance belongs to the particular user-agent conversation, the voice agent system 300 may determine whether the utterance belongs to the particular user-agent conversation of the particular user accordingly. In 4 following paragraphs, the confidence score that the utterance belongs to the particular user-agent conversation of the particular user may be referred to as the confidence score of the utterance for simplification.

For example, the voice agent system 300 may determine that the confidence score of the utterance satisfies a first confidence score threshold (e.g., the confidence score of the utterance≥75%). In this case, the voice agent system 300 may be sufficiently confident that the utterance is spoken by the particular user to the voice agent system 300 in the particular user-agent conversation of the particular user, and therefore the voice agent system 300 may determine that the utterance belongs to the particular user-agent conversation. In response to such determination, the voice agent system 300 may include the utterance in the particular user-agent conversation of the particular user. For example, the voice agent system 300 may include the utterance in the conversation instance corresponding to the particular user-agent conversation of the particular user that is stored in the storage device of the voice agent system 300. Accordingly, the voice agent system 300 may keep track of the utterances being spoken in the particular user-agent conversation, and thus the particular user may communicate with the voice agent system 300 in the particular user-agent conversation without repeating the trigger word (e.g., "Hey ABAI") in each utterance. As a result, the voice agent system 300 may provide natural experience for the particular user when the particular user interacts with the voice agent system 300. In some embodiments, in response to determining that the utterance belongs to the particular user-agent conversation, the voice agent system 300 may be responsive to the utterance. For example, the voice agent system 300 may provide a response to the utterance in the particular user-agent conversation, perform an action indicated in the utterance and provide an utterance to the particular user indicating that the action has been performed, etc.

Alternatively, the voice agent system 300 may determine that the confidence score of the utterance does not satisfy a second confidence score threshold (e.g., the confidence score of the utterance<15%). In this case, the voice agent system 300 may be sufficiently confident that the utterance is not spoken by the particular user to the voice agent system 300 in the particular user-agent conversation of the particular user, and therefore the voice agent system 300 may determine that the utterance does not belong to the particular user-agent conversation. In response to such determination, the voice agent system 300 may not include the utterance in the particular user-agent conversation of the particular user, and the voice agent system 300 may disregard or ignore the utterance. For example, the voice agent system 300 may not provide a response to the utterance. Additionally or alternatively, the voice agent system 300 may not perform an action indicated in the utterance and may or may not provide an utterance to the particular user indicating that the action will not be performed, etc.

Alternatively, the voice agent system 300 may determine that the confidence score of the utterance satisfies the second confidence score threshold and does not satisfy the first confidence score threshold (e.g., 15%≤the confidence score of the utterance<75%). In this case, the voice agent system 300 may be insufficiently confident about whether the utterance is spoken by the particular user to the voice agent system 300 in the particular user-agent conversation. Accordingly, the voice agent system 300 may request the particular user to verify whether the particular user speaks the utterance to the voice agent system 300. As an example, the utterance may be "What is the dynamic brake resistor on PowerFlex 525?" and the voice agent system 300 may be insufficiently confident about whether the utterance is spoken by the particular user to the voice agent system 300. In this case, the voice agent system 300 may ask the particular user "Did you say 'what is the dynamic brake resistor on PowerFlex 525' to me?" In response to this utterance, the voice agent system 300 may receive an utterance indicating a verification from the particular user.

In some embodiments, based on the verification provided by the particular user, the voice agent system 300 may update the confidence score of the utterance accordingly. For example, the particular user may verify that the particular user speaks the utterance to the voice agent system 300. Based on this verification, the voice agent system 300 may be completely confident that the utterance belongs to the particular user-agent conversation of the particular user. Therefore, the voice agent system 300 may update the confidence score of the utterance to be 100% and determine that the utterance belongs to the particular user-agent conversation. In this case, the voice agent system 300 may include the utterance in the particular user-agent conversation and may be responsive to the utterance as described above. Alternatively, the particular user may verify that the particular user does not speak the utterance to the voice agent system 300. Based on this verification, the voice agent system 300 may be completely confident that the utterance does not belong to the particular user-agent conversation of the particular user. Therefore, the voice agent system 300 may update the confidence score of the utterance to be 0% and determine that the utterance does not belong to the particular user-agent conversation. In this case, the voice agent system 300 may not include the utterance in the particular user-agent conversation and may disregard or ignore the utterance as described above.

In some embodiments, if the voice agent system 300 determines that the utterance does not belong to the particular user-agent conversation, the voice agent system 300 may evaluate the second confidence score that the utterance content of the utterance is relevant to the topic of the particular user-agent conversation, and determine whether second confidence score satisfies a predefined threshold. If the second confidence score satisfies the predefined threshold (e.g., the second confidence score>87%), the voice agent system 300 may determine that the utterance is highly relevant to the particular user-agent conversation even though the utterance does not belong to the particular user-agent conversation. In this case, the voice agent system 300 may store the utterance content of the utterance as an additional conversation context of the particular user-agent conversation that can be used in processing future utterances for the particular user-agent conversation. For example, the voice agent system 300 may reference the utterance content of the utterance to infer missing information or ambiguous information, determine an utterance content, determine a candidate action, and/or perform other utterance processing for a subsequent utterance captured at a later time that potentially belongs to the particular user-agent conversation.

Thus, for the utterance that has the voice signature of the utterance matching the voice signature profile associated with the particular user-agent conversation of the particular user, the voice agent system 300 may determine the confidence score that the utterance belongs to the particular user-agent conversation of the particular user as described above. The voice agent system 300 may also determine the candidate action indicated in the utterance based on the utterance content of the utterance as described above. In some embodiments, the voice agent system 300 may determine an overall confidence score of the candidate action based on the confidence score that the utterance belongs to the particular user-agent conversation of the particular user and based on other factors. The overall confidence score of the candidate action may indicate a level at which the voice agent system 300 is confident that the voice agent system 300 is requested to perform the candidate action by the particular user when the utterance is spoken by the particular user in the particular user-agent conversation.

In some embodiments, the voice agent system 300 may use one or more utterance contexts of the utterance (e.g., the utterance content of the utterance, the emotional distress level of the utterance, the industrial devices 120 associated with the utterance, etc.) and/or one or more conversation contexts of the particular user-agent conversation (e.g., the user location of the user during the user-agent conversation, etc.) in determining the overall confidence score of the candidate action. For example, in addition to the confidence score that the utterance belongs to the particular user-agent conversation of the particular user, the overall confidence score of the candidate action may also be determined based on one or more of the confidence score of the utterance content of the utterance, the emotional distress level of the utterance, the device information of the industrial devices 120 associated with the utterance, and/or the user location of the particular user relative to the industrial devices 120 associated with the utterance. Other types of context and/or other factors may also be used in determining the overall confidence score of the candidate action.

Thus, as described above, the overall confidence score of the candidate action may be determined based on various contexts (e.g., the utterance contexts of the utterance, the conversation contexts of the particular user-agent conversation, etc.). Accordingly, based on the overall confidence score of the candidate action, the voice agent system 300 may determine whether the voice agent system 300 is requested to perform the candidate action by the particular user in the particular user-agent conversation with a high level of accuracy. The voice agent system 300 may then perform a corresponding operation (e.g., performing the candidate action, ignoring the utterance without performing the candidate action, requesting a user confirmation of the candidate action, etc.) accordingly.

As an example, the voice agent system 300 may determine an initial value of the overall confidence score of the candidate action to be equal to the confidence score of the utterance content of the utterance. As described herein, the confidence score of the utterance content of the utterance may indicate the level at which the voice agent system 300 is confident about the utterance content of the utterance and may be provided as an output of the speech recognition operation (e.g., the NLP operation) performed on the utterance. Additionally or alternatively, the voice agent system 300 may determine the initial value of the overall confidence score of the candidate action to be directly proportional to the confidence score of the utterance content of the utterance. Other implementations for determining the initial value of the overall confidence score of the candidate action are also possible and contemplated.

In some embodiments, the voice agent system 300 may adjust the overall confidence score of the candidate action based on the confidence score that the utterance belongs to the particular user-agent conversation of the particular user. For example, the voice agent system 300 may determine that the confidence score that the utterance belongs to the particular user-agent conversation satisfies a predefined confidence score threshold. In response to such determination, the voice agent system 300 may adjust the overall confidence score of the candidate action by a predefined amount.

For example, the voice agent system 300 may determine that the confidence score that the utterance belongs to the particular user-agent conversation satisfies the first confidence score threshold (e.g., the confidence score≥75%). In this case, the voice agent system 300 may be highly confident that the utterance belongs to the particular user-agent conversation of the particular user. Thus, the voice agent system 300 may be confident that the particular user speaks the utterance to the voice agent system 300 in the particular user-agent conversation, and therefore the candidate action determined in the utterance may likely be requested by the particular user when the particular user speaks the utterance to the voice agent system 300. In this case, the voice agent system 300 may increase the overall confidence score of the candidate action by a first predefined amount (e.g., 20%).

Alternatively, the voice agent system 300 may determine that the confidence score that the utterance belongs to the particular user-agent conversation does not satisfy the second confidence score threshold (e.g., the confidence score<15%). In this case, the voice agent system 300 may be highly confident that the utterance does not belong to the particular user-agent conversation of the particular user even though the voice agent system 300 determines that the particular user speaks the utterance. In other words, the voice agent system 300 may be confident that the particular user does not speak the utterance to the voice agent system 300 in the particular user-agent conversation but speaks the utterance in another conversation of the particular user. Accordingly, the particular user may unlikely request the voice agent system 300 to perform the candidate action determined in the utterance. In this case, the voice agent system 300 may decrease the overall confidence score of the candidate action by a second predefined amount (e.g., 18%). In some embodiments, the second predefined amount may or may not equal to the first predefined amount.

Alternatively, the voice agent system 300 may determine that the confidence score that the utterance belongs to the particular user-agent conversation satisfies the second confidence score threshold and does not satisfy the first confidence score threshold (e.g., 15%≤the confidence score<75%). In this case, the voice agent system 300 may increase the overall confidence score of the candidate action by an amount directly proportional to the confidence score that the utterance belongs to the particular user-agent conversation. Thus, the more the voice agent system 300 is confident that the utterance belongs to the particular user-agent conversation of the particular user, the more the voice agent system 300 is confident that the candidate action determined in the utterance is requested by the particular user in the particular user-agent conversation using the utterance.

In some embodiments, instead of or in addition to adjusting the overall confidence score of the candidate action based on the confidence score that the utterance belongs to the particular user-agent conversation in the manner described above, the voice agent system 300 may determine the overall confidence score of the candidate action to be directly proportional to the confidence score that the utterance belongs to the particular user-agent conversation. Other implementations for determining the overall confidence score of the candidate action based on the confidence score that the utterance belongs to the particular user-agent conversation are also possible and contemplated.

In some embodiments, the confidence score that the utterance belongs to the particular user-agent conversation of the particular user may have a significant impact on the overall confidence score of the candidate action determined in the utterance. For example, the predefined amount by which the overall confidence score of the candidate action is adjusted based on the confidence score that the utterance belongs to the particular user-agent conversation may be significantly higher than the amounts by which the overall confidence score of the candidate action is adjusted based on other factors. Additionally or alternatively, the voice agent system 300 may assign a higher weight value to the confidence score that the utterance belongs to the particular user-agent conversation as compared to other factors in determining the overall confidence score of the candidate action. Thus, for the candidate action determined from the utterance, the level at which the voice agent system 300 is confident that the voice agent system 300 is requested to perform the candidate action by the particular user may highly depend on the level at which the voice agent system 300 is confident that the particular user speaks the utterance to the voice agent system 300 in the particular user-agent conversation of the particular user.

In some embodiments, the voice agent system 300 may adjust the overall confidence score of the candidate action based on the emotional distress level of the utterance. For example, the voice agent system 300 may determine whether the emotional distress level of the utterance satisfies an emotional distress threshold. If the emotional distress level of the utterance satisfies the emotional distress threshold (e.g., the emotional distress level≥65%), the voice agent system 300 may determine that the utterance is spoken in urgency or in distress, and therefore determine that the candidate action determined in the utterance is likely needed to be performed due to a potentially urgent situation. In this case, the voice agent system 300 may increase the overall confidence score of the candidate action by a predefined amount (e.g., 7%). On the other hand, if the emotional distress level of the utterance does not satisfy the emotional distress threshold (e.g., the emotional distress level<65%), the voice agent system 300 may determine that the utterance is not spoken in urgency or in distress. In this case, the voice agent system 300 may not modify the overall confidence score of the candidate action, and thus the overall confidence score of the candidate action may remain at its current value.

In some embodiments, instead of or in addition to adjusting the overall confidence score of the candidate action based on the emotional distress level of the utterance in the manner described above, the voice agent system 300 may determine the overall confidence score of the candidate action to be directly proportional to the emotional distress level of the utterance. Other implementations for determining the overall confidence score of the candidate action based on the emotional distress level of the utterance are also possible and contemplated.

In some embodiments, the voice agent system 300 may determine the overall confidence score of the candidate action based on an industrial device 120 associated with the utterance. As described herein, the industrial device 120 associated with the utterance may be a particular industrial device 120 that is explicitly specified and/or likely implied in the utterance, an industrial device 120 that is located within a predefined distance from the particular industrial device 120 and/or collaboratively operate with the particular industrial device 120 in the same industrial process, etc. In some embodiments, the voice agent system 300 may determine the device information of the industrial device 120 associated with the utterance. For example, the voice agent system 300 may obtain the device information describing various aspects (e.g., the device components, the device configuration, the device functionalities, the operation status, etc.) of the industrial device 120 associated with the utterance from the device information database.

In some embodiments, based on the device information of the industrial device 120 associated with the utterance, the voice agent system 300 may determine whether the candidate action determined in the utterance is applicable to the industrial device 120 associated with the utterance. For example, the voice agent system 300 may determine whether the industrial device 120 associated with the utterance has a device component specified in the utterance. As another example, the voice agent system 300 may determine whether the industrial device 120 associated with the utterance is already in an operation mode to be activated by the candidate action determined in the utterance.

In some embodiments, if the candidate action determined in the utterance is applicable to the industrial device 120 associated with the utterance, the voice agent system 300 may be more confident that the utterance is a request for the voice agent system 300 to perform the candidate action. In this case, the voice agent system 300 may increase the overall confidence score of the candidate action by a third predefined amount (e.g., 6%). On the other hand, if the candidate action determined in the utterance is not applicable to the industrial device 120 associated with the utterance, the voice agent system 300 may be less confident that the utterance is a request for the voice agent system 300 to perform the candidate action. In this case, the voice agent system 300 may decrease the overall confidence score of the candidate action by a fourth predefined amount (e.g., 6.5%). In some embodiments, the fourth predefined amount may or may not equal to the third predefined amount. Other implementations for determining the overall confidence score of the candidate action based on the industrial device 120 associated with the utterance are also possible and contemplated.

In some embodiments, the voice agent system 300 may determine the overall confidence score of the candidate action based on the user location of the particular user during the particular user-agent conversation. For example, the voice agent system 300 may determine the user location of the particular user relative to the industrial device 120 associated with the utterance, and determine whether the industrial device 120 associated with the utterance is located within a predefined distance (e.g., 5 m) from the user location of the particular user.

In some embodiments, if the industrial device 120 associated with the utterance is located within the predefined distance from the user location of the particular user, the voice agent system 300 may determine that the industrial device 120 associated with the utterance is located proximate to the user location of the particular user, and therefore the particular user may likely request the candidate action to be performed on the industrial device 120 associated with the utterance while working on the industrial device 120 associated with the utterance. In this case, the voice agent system 300 may increase the overall confidence score of the candidate action by a fifth predefined amount (e.g., 5%). On the other hand, if the industrial device 120 associated with the utterance is not located within the predefined distance from the user location of the particular user, the voice agent system 300 may determine that the industrial device 120 associated with the utterance is not located proximate to the user location of the particular user. Accordingly, the particular user may unlikely request the candidate action to be performed on the industrial device 120 associated with the utterance as the particular user is unlikely working on the industrial device 120 associated with the utterance. In this case, the voice agent system 300 may decrease the overall confidence score of the candidate action by a sixth predefined amount (e.g., 5.2%). In some embodiments, the sixth predefined amount may or may not equal to the fifth predefined amount. Other implementations for determining the overall confidence score of the candidate action based on the user location of the particular user are also possible and contemplated.

In some embodiments, after the overall confidence score of the candidate action indicated in the utterance is determined based on various factors as described above, the voice agent system 300 may perform an operation based on the overall confidence score of the candidate action. For example, the voice agent system 300 may determine that the overall confidence score of the candidate action satisfies a first overall confidence score threshold (e.g., the overall confidence score≥80%). In this case, the voice agent system 300 may be sufficiently confident that the voice agent system 300 is requested to perform the candidate action by the particular user when the utterance is spoken by the particular user in the particular user-agent conversation. Accordingly, the voice agent system 300 may perform the candidate action, and provide an utterance to the particular user indicating that the candidate action has been performed.

Alternatively, the voice agent system 300 may determine that the overall confidence score of the candidate action does not satisfy a second overall confidence score threshold (e.g., the overall confidence score<10%). In this case, the voice agent system 300 may be sufficiently confident that the voice agent system 300 is not requested to perform the candidate action by the particular user using the utterance when the utterance is spoken. Accordingly, the voice agent system 300 may ignore the utterance without performing the candidate action indicated in the utterance. In this case, the voice agent system 300 may or may not provide an utterance to the particular user indicating that the candidate action will not be performed.

Alternatively, the voice agent system 300 may determine that the overall confidence score of the candidate action satisfies the second overall confidence score threshold and does not satisfy the first overall confidence score threshold (e.g., 10%≤the overall confidence score<80%). In this case, the voice agent system 300 may be insufficiently confident about whether the voice agent system 300 is requested to perform the candidate action by the particular user using the utterance when the utterance is spoken. Accordingly, the voice agent system 300 may request a user confirmation of the candidate action from the particular user. As an example, the candidate action indicated in the utterance may be to stop Drive 3, and the voice agent system 300 may be insufficiently confident about whether the voice agent system 300 is requested to perform the candidate action by the particular user using the utterance when the utterance is spoken. In this case, the voice agent system 300 may ask the particular user "Do you want me to stop Drive 3?" In response to this utterance, the voice agent system 300 may receive an utterance indicating a user confirmation of the candidate action from the particular user.

In some embodiments, based on the user confirmation of the candidate action provided by the particular user, the voice agent system 300 may update the overall confidence score of the candidate action accordingly. For example, the particular user may confirm that the particular user requests the voice agent system 300 to perform the candidate action. Based on this user confirmation, the voice agent system 300 may be completely confident that the voice agent system 300 is requested to perform the candidate action by the particular user. Therefore, the voice agent system 300 may update the overall confidence score of the candidate action to be 100% and perform the candidate action. The voice agent system 300 may then provide an utterance to the particular user indicating that the candidate action has been performed.

Alternatively, the particular user may confirm that the particular user does not request the voice agent system 300 to perform the candidate action. Based on this user confirmation, the voice agent system 300 may be completely confident that the voice agent system 300 is not requested to perform the candidate action by the particular user. Therefore, the voice agent system 300 may update the overall confidence score of the candidate action to be 0% and may not perform the candidate action. The voice agent system 300 may also provide an utterance to the particular user indicating that the candidate action will not be performed.

Alternatively, the particular user may confirm that the particular user does not request the voice agent system 300 to perform the candidate action but requests the voice agent system 300 to perform a different action. Based on this user confirmation, the voice agent system 300 may update the candidate action associated with the utterance to be the different action and update the overall confidence score of the candidate action to be 100%. The voice agent system 300 may then perform the different action and provide an utterance to the particular user indicating that the different action has been performed.

Thus, the voice agent system 300 may evaluate the overall confidence score of the candidate action determined in the utterance based on the first overall confidence score threshold and the second overall confidence score threshold as described above. Based on this evaluation, the voice agent system 300 may perform the candidate action determined in the utterance, ignore the utterance without performing the candidate action, or request the user confirmation of the candidate action accordingly. In some embodiments, the voice agent system 300 may dynamically adjust the first overall confidence score threshold and/or the second overall confidence score threshold based on the candidate action determined in the utterance.

As a first example, the voice agent system 300 may determine that the candidate action is a critical action that has a high-level risk of resulting in severe consequences if the candidate action is unintentionally performed. Non-limiting examples of the candidate action in this case include starting an industrial device 120, stopping an industrial device 120, changing an operation mode of an industrial device 120, and/or other actions that impact operations of an industrial device 120. In some embodiments, for this type of candidate action, the voice agent system 300 may adjust the first overall confidence score threshold to be relatively high (e.g., the first overall confidence score threshold≥95%) and adjust the second overall confidence score threshold to be relatively low (e.g., the second overall confidence score threshold<7%). Thus, due to the high-level risk of the candidate action in this case, the voice agent system 300 may perform the candidate action without requesting the user confirmation of the candidate action only when the voice agent system 300 is highly confident that the voice agent system 300 is requested to perform the candidate action by the particular user using the utterance when the utterance is spoken. The voice agent system 300 may also ignore the utterance without requesting the user confirmation of the candidate action only when the voice agent system 300 is highly confident that the voice agent system 300 is not requested to perform the candidate action by the particular user using the utterance when the utterance is spoken.

As a second example, the voice agent system 300 may determine that the candidate action is a non-critical action that has a low-level risk of resulting in severe consequences if the candidate action is unintentionally performed. Non-limiting examples of the candidate action in this case include providing information of an industrial device 120, uploading information of an industrial device 120 to the cloud platform 102, and/or other actions that do not impact operations of an industrial device 120. In some embodiments, for this type of candidate action, the voice agent system 300 may adjust the first overall confidence score threshold to be lower than the first overall confidence score threshold in the first example (e.g., the first overall confidence score threshold<95%) and adjust the second overall confidence score threshold to be higher than the second overall confidence score threshold in the first example (e.g., the second overall confidence score threshold>7%). Thus, due to the low-level risk of the candidate action in this case, the voice agent system 300 may perform the candidate action without requesting the user confirmation of the candidate action even when the voice agent system 300 is less highly confident that the voice agent system 300 is requested to perform the candidate action by the particular user using the utterance when the utterance is spoken. The voice agent system 300 may also ignore the utterance without requesting the user confirmation of the candidate action even when the voice agent system 300 is less highly confident that the voice agent system 300 is not requested to perform the candidate action by the particular user using the utterance when the utterance is spoken.

To illustrate the utterance processing performed by the voice agent system 300 described above, an example scenario is provided. In the example scenario, a first user (e.g., Carol) and a second user (e.g., Frank) may be working on a technical issue of a manufacturing line at the physical area 200 where an industrial device 120 (e.g., Drive 3) is behaving abnormally. While working on Drive 3 at the physical area 200, Carol and Frank may communicate with the voice agent system 300 for assistance.

To communicate with the voice agent system 300, Carol may initiate a first user-agent conversation between Carol and the voice agent system 300 using an utterance including the trigger word of the voice agent system 300 (e.g., "Hey, ABAI"). When detecting the utterance including the trigger word spoken by Carol, the voice agent system 300 may identify the user who speaks the utterance and authenticate the user (e.g., Carol) as described herein. After Carol is successfully authenticated, the voice agent system 300 may establish the first user-agent conversation between Carol and the voice agent system 300. The first user-agent conversation between Carol and the voice agent system 300 may be referred to herein as the user-agent conversation associated with Carol, the user-agent conversation of Carol, or the Carol-agent conversation. The Carol-agent conversation may be associated with a voice signature profile of Carol.

Similarly, Frank may initiate a second user-agent conversation between Frank and the voice agent system 300 using an utterance including the trigger word of the voice agent system 300 (e.g., "Hey, ABAI"). When detecting the utterance including the trigger word spoken by Frank, the voice agent system 300 may identify the user who speaks the utterance and authenticate the user (e.g., Frank) as described herein. After Frank is successfully authenticated, the voice agent system 300 may establish the second user-agent conversation between Frank and the voice agent system 300. The second user-agent conversation between Frank and the voice agent system 300 may be referred to herein as the user-agent conversation associated with Frank, the user-agent conversation of Frank, or the Frank-agent conversation. The Frank-agent conversation may be associated with a voice signature profile of Frank.

As described herein, both the Carol-agent conversation and the Frank-agent conversation may be monitored by the voice agent system 300 together with other user-agent conversations of other users that continue simultaneously in the physical area 200. While communicating with the voice agent system 300 in their user-agent conversations, Carol and Frank may also participate in a conversation between Carol and Frank about the operations of Drive 3 and another conversation between Carol and Frank about their summer vacations.

As a first example in the example scenario, Carol may speak an utterance "ABAI, activate debug mode for Drive 3" and the voice agent system 300 may detect this utterance in the audio stream associated with the physical area 200. To perform the utterance processing for this utterance, the voice agent system 300 may determine a voice signature of the utterance, and compare the voice signature of the utterance to the voice signature profiles associated with the user-agent conversations currently monitored by the voice agent system 300. In this example, the voice agent system 300 may determine that the voice signature of the utterance matches the voice signature profile of Carol, which is associated with the Carol-agent conversation between Carol and the voice agent system 300. Accordingly, the voice agent system 300 may determine that the utterance is spoken by Carol and that the utterance may potentially belong to the Carol-agent conversation. In this example, the voice agent system 300 may determine that the voice signature of the utterance matches the voice signature profile of Carol with a first confidence score of 85%, and thus the voice agent system 300 may determine that the utterance is spoken by Carol with the first confidence score of 85%.

In some embodiments, the voice agent system 300 may determine the utterance content of the utterance with a confidence score associated with the utterance content of the utterance. In this case, the voice agent system 300 may determine that the utterance content of the utterance is "ABAI, activate debug mode for Drive 3." As the utterance content of the utterance specifies an action (e.g., activating the debug mode) together with an industrial device 120 subjected to the action (e.g., Drive 3) and the word identifying the voice agent system 300 (e.g., "ABAI") is also included in the utterance content of the utterance, the voice agent system 300 may be relatively confident about the utterance content of the utterance, and thus the confidence score of the utterance content of the utterance may be relatively high (e.g., 65%). In some embodiments, the voice agent system 300 may also determine a candidate action based on the utterance content of the utterance. In this case, the voice agent system 300 may determine that the utterance content of the utterance includes a command word "activate," and determine that the candidate action indicated in the utterance is to activate the debug mode on Drive 3.

In some embodiments, the voice agent system 300 may determine whether the utterance content of the utterance is relevant to the topic of the Carol-agent conversation to which the utterance may potentially belong. In this case, the voice agent system 300 may determine that the utterance content of the utterance is related to the operation mode of Drive 3 and the topic of the Carol-agent conversation is also related to the operations of Drive 3. Accordingly, the voice agent system 300 may determine that the utterance content of the utterance is relevant to the topic of the Carol-agent conversation. In this example, the voice agent system 300 may determine that the utterance content of the utterance is relevant to the topic of the Carol-agent conversation with a second confidence score of 80%.

In some embodiments, as the voice signature of the utterance matches the voice signature profile of Carol and the utterance may potentially belong to the Carol-agent conversation, the voice agent system 300 may evaluate the user orientation of Carol at the utterance timestamp of the utterance. For example, based on the user orientation of Carol relative to the positions of other people at the utterance timestamp of the utterance as depicted in one or more images, the voice agent system 300 may determine that Carol is not facing a different person at the utterance timestamp when the utterance is spoken. Accordingly, the voice agent system 300 may determine that Carol orientates towards a different person at the utterance timestamp of the utterance with a third confidence score that is relatively low (e.g., 10%).

In some embodiments, the voice agent system 300 may determine a confidence score that the utterance belongs to the Carol-agent conversation based on the first confidence score that the utterance is spoken by Carol (e.g., 85%), the second confidence score that the utterance content of the utterance is relevant to the topic of the Carol-agent conversation (e.g., 80%), and the third confidence score that Carol orientates towards a different person at the utterance timestamp of the utterance (e.g., 10%). In this example, the voice agent system 300 may determine the confidence score that the utterance belongs to the Carol-agent conversation to be 87%. Thus, due to the relatively high levels at which the voice agent system 300 is confident that the utterance is spoken by Carol, that the utterance content of the utterance is relevant to the topic of the Carol-agent conversation, and that Carol does not orientate towards a different person at the utterance timestamp when the utterance is spoken, the voice agent system 300 may be confident that Carol speaks the utterance to the voice agent system 300 in the Carol-agent conversation, and thus the confidence score that the utterance belongs to the Carol-agent conversation may be relatively high (e.g., 87%). In this example, the voice agent system 300 may determine that the confidence score that the utterance belongs to the Carol-agent conversation satisfies the first confidence score threshold (e.g., the confidence score≥75%), and therefore determine that the utterance belongs to the Carol-agent conversation. The voice agent system 300 may then update the Carol-agent conversation to include the utterance as an utterance spoken by Carol in the Carol-agent conversation. Accordingly, the voice agent system 300 may keep track of the utterances spoken in the Carol-agent conversation, thereby monitoring the Carol-agent conversation.

In some embodiments, the voice agent system 300 may determine an overall confidence score of the candidate action indicated in the utterance based on the confidence score that the utterance belongs to the Carol-agent conversation and based on other factors. In this example, the candidate action indicated in the utterance may be to activate the debug mode on Drive 3, and the overall confidence score of the candidate action may indicate the level at which the voice agent system 300 is confident that the candidate action of activating the debug mode on Drive 3 is requested by Carol in the Carol-agent conversation using the utterance. The determination of the overall confidence score for the candidate action is illustrated in a diagram 500 of FIG. 5A.

As depicted in FIG. 5A, the voice agent system 300 may determine an initial value of the overall confidence score of the candidate action to be equal to the confidence score of the utterance content of the utterance (e.g., 65%). The voice agent system 300 may then adjust the overall confidence score of the candidate action based on the confidence score that the utterance belongs to the Carol-agent conversation. For example, as the confidence score that the utterance belongs to the Carol-agent conversation satisfies the first confidence score threshold (e.g., the confidence score≥75%), the voice agent system 300 may increase the overall confidence score of the candidate action by a predefined amount (e.g., 19%) from 65% to 84% as depicted in FIG. 5A. Thus, as the voice agent system 300 is highly confident that Carol speaks the utterance to the voice agent system 300 in the Carol-agent conversation, the voice agent system 300 may be increasingly confident that the candidate action indicated in the utterance (e.g., activating the debug mode on Drive 3) is requested by Carol in the Carol-agent conversation using the utterance.

In some embodiments, the voice agent system 300 may determine the overall confidence score of the candidate action based on the device information of Drive 3 that is specified in the utterance. As described above, the voice agent system 300 may determine that the candidate action indicated in the utterance is to activate the debug mode on Drive 3. The voice agent system 300 may also determine that Drive 3 has the debug mode and has an error notification. For example, the voice agent system 300 may obtain the device information of Drive 3 from the device information database, and determine that Drive 3 has the debug mode and has the error notification with the confidence score of 100%. In this case, the voice agent system 300 may determine that the candidate action of activating the debug mode is applicable on Drive 3 and is likely requested due to the error condition of Drive 3. Accordingly, the voice agent system 300 may be more confident that the utterance is a request for the voice agent system 300 to perform the candidate action on Drive 3, and thus the voice agent system 300 may increase the overall confidence score of the candidate action from 84% to 89% as depicted in FIG. 5A.

In some embodiments, the voice agent system 300 may determine the overall confidence score of the candidate action based on the user location of Carol who speaks the utterance as determined by the voice agent system 300. For example, the voice agent system 300 may evaluate the user location of Carol relative to the device location of Drive 3 that is specified in the utterance, and determine that the user location of Carol is proximate to the device location of Drive 3 with the confidence score of 85%. Due to the proximity between Carol and Drive 3, the voice agent system 300 may determine that Carol may be working on Drive 3 and may request the candidate action to be performed on Drive 3 while working on Drive 3. Accordingly, the voice agent system 300 may be more confident that the candidate action to be performed on Drive 3 is requested by Carol using the utterance, and thus the voice agent system 300 may increase the overall confidence score of the candidate action from 89% to 92% as depicted in FIG. 5A.

Thus, as depicted in FIG. 5A, the voice agent system 300 may evaluate the confidence score of the utterance content of the utterance (65%) and evaluate the confidence score that the utterance is spoken by Carol to the voice agent system 300 in the Carol-agent conversation (e.g., 87%). The voice agent system 300 may also evaluate whether the candidate action indicated in the utterance is applicable to Drive 3 that is specified in the utterance and also evaluate the user location of Carol relative to the device location of Drive 3. Based on these evaluations, the voice agent system 300 may be highly confident that the candidate action indicated in the utterance (e.g., activating the debug mode on Drive 3) is requested by Carol when Carol speaks the utterance to the voice agent system 300 in the Carol-agent conversation, and this level of confidence may be reflected in the overall confidence score of the candidate action that is relatively high (e.g., 92%). In this example, the voice agent system 300 may determine that the overall confidence score of the candidate action satisfies the first overall confidence score threshold (e.g., the overall confidence score≥80%), and therefore the voice agent system 300 may perform the candidate action without requesting a user confirmation of the candidate action. For example, the voice agent system 300 may activate the debug mode on Drive 3 and provide to Carol an utterance "Debug mode activated" to indicate that the activation of the debug mode on Drive 3 has been performed.

As a second example in the example scenario, a manager (e.g., Eve) may stop by the physical area 200 to get an update on the technical issue of Drive 3 from Carol and Frank. Eve may speak an utterance "You should run Drive 3 at default voltage and see what happens" and the voice agent system 300 may detect this utterance in the audio stream associated with the physical area 200. To perform the utterance processing for this utterance, the voice agent system 300 may determine a voice signature of the utterance, and compare the voice signature of the utterance to the voice signature profiles associated with the user-agent conversations currently monitored by the voice agent system 300. In this example, the voice agent system 300 may determine that the voice signature of the utterance does not match any voice signature profile among the voice signature profiles associated with the user-agent conversations currently monitored by the voice agent system 300. Accordingly, the voice agent system 300 may determine that the utterance is spoken by a user who does not initiate a user-agent conversation with the voice agent system 300 using the trigger word of the voice agent system 300 (e.g., "Hey, ABAI") and therefore the user who speaks the utterance does not have the user-agent conversation between the user and the voice agent system 300 established or the user-agent conversation between the user and the voice agent system 300 is no longer active. As the user does not interact with the voice agent system 300 in one of the user-agent conversations that are currently monitored by the voice agent system 300, the voice agent system 300 may disregard or ignore the utterance. For example, the voice agent system 300 may not respond to the utterance spoken by Eve and may not perform an action indicated in the utterance (e.g., running Drive 3 at the default voltage).

In some embodiments, for the utterance spoken by the user who does not interact with the voice agent system 300 in one of the user-agent conversations that are currently monitored by the voice agent system 300, the voice agent system 300 may disregard or ignore the utterance as described above, and therefore the voice agent system 300 may not perform other processing operations on the utterance after determining the voice signature of the utterance. For example, the voice agent system 300 may not determine the utterance content of the utterance, the emotional distress level of the utterance, the industrial devices 120 associated with the utterance, the user orientation associated with the utterance, etc.

Additionally or alternatively, for the utterance spoken by the user who does not interact with the voice agent system 300 in one of the user-agent conversations that are currently monitored by the voice agent system 300, the voice agent system 300 may determine the utterance content of the utterance, and determine one or more user-agent conversations that have their topics relevant to the utterance content of the utterance among the user-agent conversations currently monitored by the voice agent system 300. The voice agent system 300 may then use the utterance content of the utterance in processing subsequent utterances in the one or more user-agent conversations when applicable. In some embodiments, the subsequent utterances may be spoken in the one or more user-agent conversations after the utterance is spoken by the user, and therefore the subsequent utterances may have their utterance timestamps subsequent to the utterance timestamp of the utterance.

As an example, for the utterance spoken by Eve, the voice agent system 300 may determine that the utterance is related to the operations of Drive 3. The voice agent system 300 may determine that the topic of the Carol-agent conversation and the topic of the Frank-agent conversation are also related to the operations of Drive 3. Accordingly, the voice agent system 300 may determine that the utterance content of the utterance is relevant to the topic of the Carol-agent conversation and the topic of the Frank-agent conversation. In this example, the voice agent system 300 may store the utterance content of the utterance in association with the Carol-agent conversation and the Frank-agent conversation as an additional conversation context of these user-agent conversations, and thus the utterance content of the utterance may be used in processing subsequent utterances in the Carol-agent conversation and the Frank-agent conversation.

For example, following the suggestion provided by Eve to run Drive 3 at the default voltage, Frank may speak an utterance "How high is that voltage?" When determining the utterance content of this utterance, the voice agent system 300 may determine that the type of voltage and the industrial device 120 are not specified in the utterance spoken by Frank. In this example, the voice agent system 300 may reference the utterance content of the utterance spoken by Eve, which is a conversation context included most recently in the conversation contexts of the Frank-agent conversation, and determine that the voltage and the industrial device 120 being implied in the utterance spoken by Frank are the default voltage and Drive 3. The voice agent system 300 may then obtain the value of the default voltage on Drive 3 from the device information database, and provide to Frank a response utterance "The default voltage of Drive 3 is 500V."

Additionally or alternatively, for the utterance spoken by the user who does not interact with the voice agent system 300 in one of the user-agent conversations that are currently monitored by the voice agent system 300, the voice agent system 300 may determine the utterance content and the emotional distress level of the utterance. In some embodiments, the voice agent system 300 may analyze the utterance content of the utterance to determine whether the utterance indicates an emergency request or an attempt to get help (e.g., the utterance content of the utterance includes "stop, stop, stop" or "help, help"). The voice agent system 300 may also analyze the emotional distress level of the utterance to determine whether the user speaks the utterance in urgency or in distress (e.g., screaming, yelling, etc.). Based on these determinations, the voice agent system 300 may determine whether the user speaks the utterance in an emergency situation.

In some embodiments, if the user speaks the utterance in an emergency situation, the voice agent system 300 may be responsive to the utterance, even though the utterance is spoken by the user who does not initiate a user-agent conversation with the voice agent system 300 and does not interact with the voice agent system 300 in a user-agent conversation. For example, the voice agent system 300 may identify the user location of the user who speaks the utterance based on the device locations of the spatial microphones that capture the utterance as described herein. The voice agent system 300 may then identify the industrial devices 120 located within a predefined distance (e.g., 5 m) from the user location of the user, and initiate emergency stop commands to these industrial devices 120 as an attempt to mitigate the emergency situation.

As a third example in the example scenario, while Carol and Frank are working on Drive 3 at the physical area 200, a coworker (e.g., Trudy) may walk by and ask "Did you watch the soccer game last night?" In response to Trudy, Carol may speak an utterance "Yes, the stop by the goalie really saved AC Milan." In this example, the voice agent system 300 may detect the utterance spoken by Trudy and the utterance spoken by Carol in the audio stream associated with the physical area 200.

The utterance processing for the utterance spoken by Trudy will not be described in this example. To perform the utterance processing for the utterance spoken by Carol, the voice agent system 300 may determine a voice signature of this utterance, and compare the voice signature of the utterance to the voice signature profiles associated with the user-agent conversations currently monitored by the voice agent system 300. Similar to the first example in the example scenario, in this example, the voice agent system 300 may determine that the voice signature of the utterance matches the voice signature profile of Carol, which is associated with the Carol-agent conversation between Carol and the voice agent system 300. Accordingly, the voice agent system 300 may determine that the utterance is spoken by Carol and that the utterance may potentially belong to the Carol-agent conversation. In this example, the voice agent system 300 may determine that the voice signature of the utterance matches the voice signature profile of Carol with a first confidence score of 86%, and thus the voice agent system 300 may determine that the utterance is spoken by Carol with the first confidence score of 86%.

In some embodiments, the voice agent system 300 may determine the utterance content of the utterance with a confidence score associated with the utterance content of the utterance. In this case, the voice agent system 300 may determine that the utterance content of the utterance is "Yes, the stop by the goalie really saved AC Milan." As the utterance content of the utterance specifies an action (e.g., stop) but does not specify an industrial device 120 subjected to the action and the utterance content of the utterance appears to be unrelated to the industrial context, the voice agent system 300 may not be confident about the utterance content of the utterance, and thus the confidence score of the utterance content of the utterance may be relatively low (e.g., 18%). In some embodiments, the voice agent system 300 may also determine a candidate action based on the utterance content of the utterance. In this case, the voice agent system 300 may determine that the utterance content of the utterance includes a command word "stop," and determine that the candidate action determined in the utterance is to stop an industrial device 120 that is not specified in the utterance.

In some embodiments, the voice agent system 300 may determine whether the utterance content of the utterance is relevant to the topic of the Carol-agent conversation to which the utterance may potentially belong. In this case, the voice agent system 300 may determine that the utterance content of the utterance is related to the soccer game while the topic of the Carol-agent conversation is related to the operations of Drive 3. Accordingly, the voice agent system 300 may determine that the utterance content of the utterance is not relevant to the topic of the Carol-agent conversation. Thus, in this example, the voice agent system 300 may determine that the utterance content of the utterance is relevant to the topic of the Carol-agent conversation with a second confidence score that is relatively low (e.g., 12%).

In some embodiments, as the voice signature of the utterance matches the voice signature profile of Carol and the utterance may potentially belong to the Carol-agent conversation, the voice agent system 300 may evaluate the user orientation of Carol at the utterance timestamp of the utterance. For example, based on the user orientation of Carol relative to the positions of other people at the utterance timestamp of the utterance as depicted in one or more images, the voice agent system 300 may determine that Carol is facing a different person (e.g., Trudy) at the utterance timestamp when the utterance is spoken. Accordingly, the voice agent system 300 may determine that Carol orientates towards a different person at the utterance timestamp of the utterance with a third confidence score that is relatively high (e.g., 75%).

In some embodiments, the voice agent system 300 may determine a confidence score that the utterance belongs to the Carol-agent conversation based on the first confidence score that the utterance is spoken by Carol (e.g., 86%), the second confidence score that the utterance content of the utterance is relevant to the topic of the Carol-agent conversation (e.g., 12%), and the third confidence score that Carol orientates towards a different person at the utterance timestamp of the utterance (e.g., 75%). In this example, the voice agent system 300 may determine the confidence score that the utterance belongs to the Carol-agent conversation to be 14%. Thus, due to the relatively high levels at which the voice agent system 300 is confident that the utterance is spoken by Carol, that the utterance content of the utterance is not relevant to the topic of the Carol-agent conversation, and that Carol orientates towards a different person (e.g., Trudy) at the utterance timestamp when the utterance is spoken, the voice agent system 300 may be confident that Carol does not speak the utterance to the voice agent system 300 in the Carol-agent conversation, but instead speaks the utterance in another conversation that Carol participates in simultaneously while interacting with the voice agent system 300 in the Carol-agent conversation. Accordingly, the confidence score that the utterance belongs to the Carol-agent conversation may be relatively low (e.g., 14%). In this example, the voice agent system 300 may determine that the confidence score that the utterance belongs to the Carol-agent conversation does not satisfy the second confidence score threshold (e.g., the confidence score<15%), and therefore determine that the utterance does not belong to the Carol-agent conversation. As a result, the voice agent system 300 may not include the utterance in the Carol-agent conversation.

In some embodiments, the voice agent system 300 may determine an overall confidence score of the candidate action indicated in the utterance based on the confidence score that the utterance belongs to the Carol-agent conversation and based on other factors. In this example, the candidate action indicated in the utterance may be to stop an industrial device 120 that is unspecified, and the overall confidence score of the candidate action may indicate the level at which the voice agent system 300 is confident that the candidate action of stopping an industrial device 120 is requested by Carol in the Carol-agent conversation using the utterance. The determination of the overall confidence score for the candidate action is illustrated in a diagram 550 of FIG. 5B.

As depicted in FIG. 5B, the voice agent system 300 may determine an initial value of the overall confidence score of the candidate action to be equal to the confidence score of the utterance content of the utterance (e.g., 18%). The voice agent system 300 may then adjust the overall confidence score of the candidate action based on the confidence score that the utterance belongs to the Carol-agent conversation (e.g., 14%). In this example, because the confidence score that the utterance belongs to the Carol-agent conversation does not satisfy the second confidence score threshold (e.g., the confidence score<15%) and the current value of the overall confidence score of the candidate action is below a predefined value (e.g., 20%), the voice agent system 300 may not decrease the overall confidence score of the candidate action by a predefined amount (e.g., 19%), but instead decrease the overall confidence score of the candidate action by a predefined portion (e.g., ⅓) of its current value from 18% to 12% as depicted in FIG. 5B. Thus, as the voice agent system 300 is highly confident that Carol does not speak the utterance to the voice agent system 300 in the Carol-agent conversation and the utterance is not directed to the voice agent system 300, the voice agent system 300 may be significantly less confident that the candidate action determined in the utterance (e.g., stopping an industrial machine 120) is requested by Carol using the utterance.

In some embodiments, as the voice agent system 300 is highly confident that Carol does not speak the utterance to the voice agent system 300 in the Carol-agent conversation and the utterance is not directed to the voice agent system 300, the voice agent system 300 may evaluate the emotional distress level of the utterance instead of or in addition to evaluating other factors (e.g., the device information of the industrial device 120 associated with the utterance, the user location of Carol relative to the device location of the industrial device 120 associated with the utterance, etc.) in determining the overall confidence score of the candidate action. In this example, the voice agent system 300 may determine that the emotional distress level of the utterance is 10% and therefore determine that the utterance is not spoken in urgency or in distress. Accordingly, the voice agent system 300 may determine that Carol does not speak the utterance in an emergency situation, and thus the voice agent system 300 may be less confident that the candidate action (e.g., stopping an industrial machine 120) needs to be performed. Accordingly, the voice agent system 300 may decrease the overall confidence score of the candidate from 12% to 11% as depicted in FIG. 5B.

Thus, as depicted in FIG. 5B, the voice agent system 300 may evaluate the confidence score of the utterance content of the utterance (18%), the confidence score that the utterance is spoken by Carol to the voice agent system 300 in the Carol-agent conversation (e.g., 14%), and the emotional distress level of the utterance (e.g., 10%). Based on these evaluations, the voice agent system 300 may be confident that the candidate action determined in the utterance (e.g., stopping an industrial machine 120) is not requested by Carol using the utterance. In other words, the voice agent system 300 may be confident that the voice agent system 300 is not requested to perform the candidate action by Carol when Carol speaks the utterance, and this level of confidence may be reflected in the overall confidence score of the candidate action that is relatively low (e.g., 11%).

In this example, as the candidate action (e.g., stopping an industrial machine 120) has a high-level risk of resulting in severe consequences if the candidate action is unintentionally performed, the voice agent system 300 may evaluate the overall confidence score of the candidate action using an upper overall confidence score threshold that is relatively high (e.g., 85%) and a lower overall confidence score threshold that is relatively low (e.g., 10%). In this example, the voice agent system 300 may determine that the overall confidence score of the candidate action does not satisfy the lower overall confidence score threshold (e.g., the overall confidence score>10%), and therefore the voice agent system 300 may request a user confirmation of the candidate action from Carol who speaks the utterance as determined by the voice agent system 300. In this example, as the industrial device 120 is unspecified in the utterance and the topic of the Carol-agent conversation is related to the operations of Drive 3, the voice agent system 300 may determine that the industrial device 120 potentially implied in the utterance is Drive 3. Accordingly, the voice agent system 300 may provide to Carol an utterance "Carol, please confirm if you want me to stop Drive 3." In response to the voice agent system 300, Carol may speak a response utterance "No, do not stop Drive 3."

In some embodiments, based on the user confirmation provided by Carol in the response utterance, the voice agent system 300 may be completely confident that Carol does not request the voice agent system 300 to perform the candidate action of stopping an industrial device 120 (e.g., Drive 3). Accordingly, the voice agent system 300 may update the overall confidence score of the candidate action to be 0% and may not perform the candidate action. For example, the voice agent system 300 may not stop Drive 3 and provide to Carol an acknowledge utterance "OK, I will not stop Drive 3."

As a fourth example in the example scenario, while Carol and Frank are working on Drive 3 at the physical area 200, Carol may discuss the technical issue of Drive 3 with a remote technical support representative (e.g., Bob) for assistance. Bob may be located remotely from the physical area 200 and Carol may communicate with Bob via her user device (e.g., a mobile work phone) to which the voice agent system 300 has access. In the conversation between Carol and Bob, Bob may speak an utterance "Let's try the reset button on Drive 3" and the voice agent system 300 may detect this utterance on the user device of Carol as part of the audio stream associated with the physical area 200.

In some embodiments, to perform the utterance processing for the utterance spoken by Bob, the voice agent system 300 may determine a voice signature of the utterance, and compare the voice signature of the utterance to the voice signature profiles associated with the user-agent conversations currently monitored by the voice agent system 300. In this example, the voice agent system 300 may determine that the voice signature of the utterance does not match any voice signature profile among the voice signature profiles associated with the user-agent conversations currently monitored by the voice agent system 300. Accordingly, the voice agent system 300 may determine that the utterance is spoken by a user who does not initiate a user-agent conversation with the voice agent system 300 using the trigger word of the voice agent system 300 (e.g., "Hey, ABAI") and therefore the user who speaks the utterance does not have the user-agent conversation between the user and the voice agent system 300 established or the user-agent conversation between the user and the voice agent system 300 is no longer active. As the user does not interact with the voice agent system 300 in one of the user-agent conversations that are currently monitored by the voice agent system 300, the voice agent system 300 may disregard or ignore the utterance. For example, similar to the second example in the example scenario, the voice agent system 300 may not respond to the utterance spoken by Bob and may not perform an action indicated in the utterance (e.g., triggering the reset button on Drive 3).

In addition, similar to the second example in the example scenario, the voice agent system 300 may determine the utterance content of the utterance, and determine one or more user-agent conversations that have their topics relevant to the utterance content of the utterance among the user-agent conversations currently monitored by the voice agent system 300. In this example, the voice agent system 300 may determine that the utterance is related to the operations of Drive 3. The voice agent system 300 may determine that the topic of the Carol-agent conversation and the topic of the Frank-agent conversation are also related to the operations of Drive 3. Accordingly, the voice agent system 300 may determine that the utterance content of the utterance is relevant to the topic of the Carol-agent conversation and the topic of the Frank-agent conversation. Thus, similar to the second example in the example scenario, the voice agent system 300 may store the utterance content of the utterance in association with the Carol-agent conversation and the Frank-agent conversation as an additional conversation context of these user-agent conversations, and the utterance content of the utterance may then be used in processing subsequent utterances in the Carol-agent conversation and the Frank-agent conversation when applicable.

For example, following the suggestion provided by Bob to trigger the reset button on Drive 3, Carol may speak an utterance "Where is that button?" When determining the utterance content of this utterance, the voice agent system 300 may determine that the phrase "that button" in the utterance spoken by Carol is ambiguous. The voice agent system 300 may reference the utterance content of the utterance spoken by Bob, which is a conversation context added most recently to the conversation contexts of the Carol-agent conversation, and determine that the button being implied in the utterance spoken by Carol is the reset button of Drive 3. The voice agent system 300 may then obtain the location of the reset button on Drive 3 from the device information database, and provide to Carol a response utterance "The reset button of Drive 3 is the red button on the upper left corner of the control panel."

Thus, in this example, the utterance content of the utterance spoken by Bob, who is located remotely from the physical area 200, may be used to infer ambiguous information in the utterance subsequently spoken by Carol to the voice agent system 300 in the Carol-agent conversation in the physical area 200. As the utterance in the conversation between the user located at the physical area 200 (e.g., Carol) and a different person located remotely from the physical area 200 (e.g., Bob) may be used in processing the utterance in the conversation between the user located at the physical area 200 (e.g., Carol) and the voice agent system 300, the accuracy in processing the utterance in the conversation between the user located at the physical area 200 and the voice agent system 300 (e.g., the Carol-agent conversation) may be improved.

Thus, as described above, for each utterance detected in the audio stream associated with the physical area 200, the voice agent system 300 may determine whether the utterance belongs to a user-agent conversation among a plurality of user-agent conversations that continue simultaneously in the physical area 200. Each user-agent conversation between a user and the voice agent system 300 may be established in response to the user speaking an utterance including a trigger word of the voice agent system 300 (e.g., "Hey, ABAI") to initiate a conversation with the voice agent system 300.

As described herein, the voice agent system 300 may determine whether the utterance belongs to a user-agent conversation among the plurality of user-agent conversations based on a voice signature of the utterance. If the voice signature of the utterance does not match any voice signature profile among a plurality of voice signature profiles associated with the plurality of user-agent conversations, the voice agent system 300 may determine that the utterance is spoken by a user who does not initiate a user-agent conversation with the voice agent system 300 and therefore does not have a user-agent conversation between the user and the voice agent system 300 established or the user-agent conversation between the user and the voice agent system 300 is no longer active. Accordingly, the voice agent system 300 may determine that the user who speaks the utterance does not interact with the voice agent system 300 in one of the plurality of user-agent conversations that are currently monitored by the voice agent system 300. In this case, the voice agent system 300 may consider the utterance as noise and may disregard or ignore the utterance. For example, the voice agent system 300 may not respond to the utterance and may not perform an action indicated in the utterance.

Thus, as described above, the voice agent system 300 may be responsive only to the utterances spoken by a plurality of users who individually initiate and participate in a user-agent conversation with the voice agent system 300 among the plurality of user-agent conversations that are established and currently monitored by the voice agent system 300. The voice agent system 300 may disregard or ignore the utterances spoken by other users. As a result, the utterances spoken by the other users cannot trigger the voice agent system 300 to perform an unintentional action that is not requested by a user among the plurality of users associated with the plurality of user-agent conversations. Accordingly, the operations of the voice agent system 300 may not be impacted by the utterances spoken by the other users, and therefore the voice agent system 300 is advantageously applicable in industrial environments where the triggering of an unintentional action by the other users who are not working with the voice agent system 300 is not allowed.

On the other hand, if the voice signature of the utterance matches a voice signature profile associated with a particular user-agent conversation of a particular user among the plurality of user-agent conversations, the voice agent system 300 may determine that the utterance potentially belongs to the particular user-agent conversation. As described herein, the voice agent system 300 may determine a confidence score that the utterance belongs to the particular user-agent conversation based on various utterance contexts (e.g., the voice signature, the utterance content, the user orientation, etc.) associated with the utterance and various conversation contexts (e.g., the voice signature profile, the topic, the user location, etc.) associated with the particular user-agent conversation. Based on the confidence score that the utterance belongs to the particular user-agent conversation, the voice agent system 300 may determine whether the utterance belongs to the particular user-agent conversation accordingly. As described herein, if the utterance belongs to the particular user-agent conversation, the voice agent system 300 may include the utterance in the particular user-agent conversation. Accordingly, the voice agent system 300 may keep track of the utterances being spoken in each user-agent conversation among the plurality of user-agent conversations, and therefore the voice agent system 300 may monitor each user-agent conversation individually.

As described herein, the voice agent system 300 may determine a candidate action to be performed by the voice agent system 300 based on the utterance content of the utterance, and determine an overall confidence score of the candidate action. As described herein, the voice agent system 300 may determine the overall confidence score of the candidate action based on the confidence score that the utterance belongs to the particular user-agent conversation of the particular user and based on other factors (e.g., the confidence score of the utterance content of the utterance, the emotional distress level of the utterance, the device information of the industrial devices 120 associated with the utterance, the user location of the particular user relative to the industrial devices 120 associated with the utterance, etc.). As described herein, the overall confidence score of the candidate action may indicate a level at which the voice agent system 300 is confident that the candidate action is requested by the particular user when the utterance is spoken by the particular user to the voice agent system 300 in the particular user-agent conversation. In other words, the overall confidence score of the candidate action may indicate a level at which the voice agent system 300 is confident that the particular user requests the voice agent system 300 to perform the candidate action in the particular user-agent conversation using the utterance. In some embodiments, the voice agent system 300 may perform a corresponding operation (e.g., perform the candidate action, ignore the utterance without performing the candidate action, request a user confirmation of the candidate action from the particular user) based on the overall confidence score of the candidate action.

Thus, as described above, the voice agent system 300 may perform the candidate action indicated in the utterance when the voice agent system 300 is confident that the particular user requests the voice agent system 300 to perform the candidate action in the particular user-agent conversation using the utterance. Accordingly, the voice agent system 300 may perform the candidate action indicated in the utterance spoken by the particular user to the voice agent system 300 in the particular user-agent conversation. The voice agent system 300 may not perform a candidate action indicated in an utterance spoken by the particular user in a different conversation, which is not a request from the particular user directed to the voice agent system 300. As a result, the particular user may communicate with the voice agent system 300 in the particular user-agent conversation and participate in other conversations (e.g., a conversation between the particular user and another user at the physical area 200, a conversation between the particular user and a remote technical support representative via a mobile work phone, etc.) at the same time without triggering the voice agent system 300 to carry out an unintentional action that the particular user does not request the voice agent system 300 to perform. Thus, as the operations of the voice agent system 300 may not be impacted by the utterances spoken by the plurality of users in other conversations and not in the plurality of user-agent conversations with the voice agent system 300, the voice agent system 300 is advantageously applicable in industrial environments where the triggering of an unintentional action by the plurality of users when they are not speaking to the voice agent system 300 is not allowed.

Figure 6:
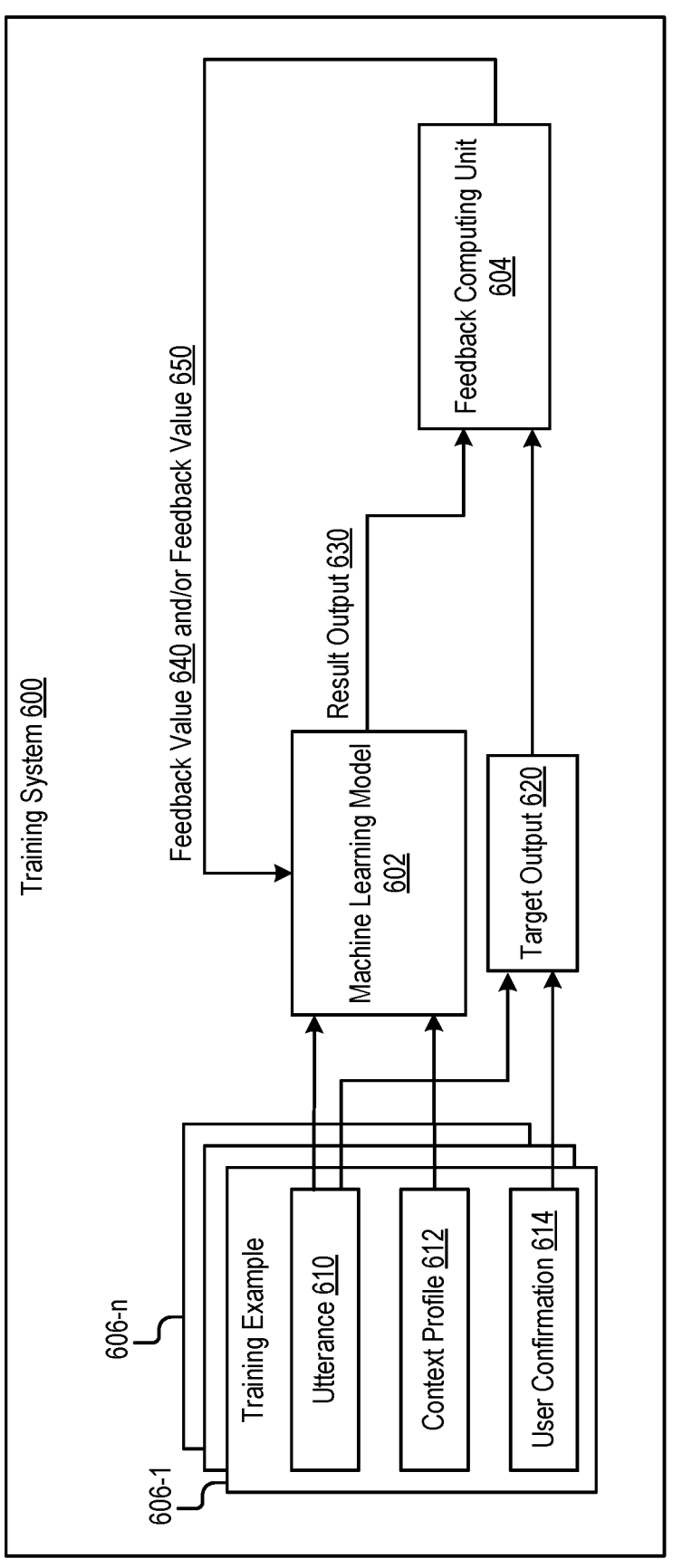
FIG. 6 illustrates an example training system for training a machine learning model.

In some embodiments, the voice agent system 300 may perform one or more processing operations described herein using a machine learning model. For example, the voice agent system 300 may apply the machine learning model to determine a candidate action indicated in the utterance and/or to perform a speech recognition operation to determine an utterance content of the utterance. In some embodiments, the machine learning model may be trained by a training system. An example training system 600 is illustrated in FIG. 6. The training system 600 may be implemented at the edge device 130, the cloud platform 102, and/or other components of the system 100. In some embodiments, various components of the system 100 may collaborate with one another to perform one or more functionalities of the training system 600 described herein.

As depicted in FIG. 6, the training system 600 may include a machine learning model 602 and a feedback computing unit 604. In some embodiments, the machine learning model 602 may be implemented using one or more supervised and/or unsupervised learning algorithms. For example, the machine learning model 602 may be implemented in the form of a linear regression model, a logistic regression model, a Support Vector Machine (SVM) model, and/or other learning models. Additionally or alternatively, the machine learning model 602 may be implemented in the form of a neural network including an input layer, one or more hidden layers, and an output layer. Non-limiting examples of the neural network include, but are not limited to, Convolutional Neural Network (CNN), Recurrent Neural Network (RNN), Long Short-Term Memory (LSTM) neural network, etc. Other system architectures for implementing the machine learning model 602 are also possible and contemplated.

In some embodiments, the machine learning model 602 may be trained with a plurality of training examples 606-1 . . . 606-n (commonly referred to herein as training examples 606). As depicted in FIG. 6, each training example 606 may include an utterance 610, a context profile 612, and a user confirmation 614.

In some embodiments, the context profile 612 may include one or more utterance contexts of the utterance 610. For example, the context profile 612 may include the voice signature of the utterance 610, the emotional distress level of the utterance 610, the utterance timestamp of the utterance 610, the source location of the utterance 610, and/or other utterance contexts of the utterance 610 as described herein. In some embodiments, the context profile 612 may also include one or more conversation contexts of a plurality of user-agent conversations that are monitored by the voice agent system 300 when the utterance 610 is spoken. For example, for each user-agent conversation among the plurality of user-agent conversations, the context profile 612 may include the voice signature profile associated with the user-agent conversation, the topic of the user-agent conversation, and/or other conversation contexts of the user-agent conversation as described herein. In addition to these conversation contexts, the context profile 612 may also include the utterances that are previously spoken in the user-agent conversation. In some embodiments, the context profile 612 may include the device information of one or more industrial devices 120 located within a predefined distance from the source location of the utterance 610. For example, the context profile 612 may include the operation status of these industrial devices 120 at the utterance timestamp when the utterance 610 is spoken. Other types of information may also be included in the context profile 612.

In some embodiments, the voice agent system 300 may determine that the utterance 610 is spoken by a particular user, and the user confirmation 614 may be provided by the particular user when the voice agent system 300 requests the particular user to provide a user confirmation of a candidate action that the voice agent system 300 determines from the utterance 610. In some embodiments, the training system 600 may determine a target output 620 corresponding to the utterance 610 based on the utterance 610 and the user confirmation 614 provided by the particular user as depicted in FIG. 6. The target output 620 may specify a target action that is actually indicated in the utterance 610 as confirmed by the particular user in the user confirmation 614. Additionally or alternatively, the target output 620 may also specify a target utterance content of the utterance 610 that is the actual utterance content of the utterance 610.

As an example, in the user confirmation 614, the particular user may confirm that the particular user requests the voice agent system 300 to stop Drive 3. Based on the user confirmation 614, the training system 600 may determine that the target action is stopping Drive 3, and include the target action of "stopping Drive 3" in the target output 620 corresponding to the utterance 610. In this example, based on the utterance 610 and the user confirmation 614, the training system 600 may determine that the target utterance content of the utterance 610 is "Please stop Drive 3," and include the target utterance content of "Please stop Drive 3" in the target output 620 corresponding to the utterance 610.

As another example, in the user confirmation 614, the particular user may confirm that the particular user does not request the voice agent system 300 to stop Drive 3. Based on the user confirmation 614, the training system 600 may determine that the target action is none, and include the target action of "none" or "no action" in the target output 620 corresponding to the utterance 610. In this example, based on the utterance 610 and the user confirmation 614, the training system 600 may determine that the target utterance content of the utterance 610 is "The stop by the goalie really saved AC Milan," and include the target utterance content of "The stop by the goalie really saved AC Milan" in the target output 620 corresponding to the utterance 610.

As another example, in the user confirmation 614, the particular user may confirm that the particular user does not request the voice agent system 300 to stop Drive 3 but request the voice agent system 300 to start Drive 3. Based on the user confirmation 614, the training system 600 may determine that the target action is starting Drive 3, and include the target action of "starting Drive 3" in the target output 620 corresponding to the utterance 610. In this example, based on the utterance 610 and the user confirmation 614, the training system 600 may determine that the target utterance content of the utterance 610 is "Start Drive 3 now," and include the target utterance content of "Start Drive 3 now" in the target output 620 corresponding to the utterance 610.

In some embodiments, to train the machine learning model 602 with a training example 606 in a training cycle, the training system 600 may use the machine learning model 602 to determine a result output 630 for an utterance 610 in the training example 606. For example, as depicted in FIG. 6, the training system 600 may provide the utterance 610 and the context profile 612 in the training example 606 to the machine learning model 602 as input, and the machine learning model 602 may generate the result output 630 based on the utterance 610 and the context profile 612. In some embodiments, the result output 630 may specify a candidate action indicated in the utterance 610 as determined by the machine learning model 602 based on the utterance 610 and the context profile 612, and also specify a confidence score indicating a level at which the machine learning model 602 is confident in the candidate action. Additionally or alternatively, the result output 630 may specify an utterance content of the utterance 610 as determined by the machine learning model 602 based on the utterance 610 and the context profile 612, and also specify a confidence score indicating a level at which the machine learning model 602 is confident in the utterance content of the utterance 610.

In some embodiments, the training system 600 may compute a feedback value 640 and a feedback value 650 based on the result output 630 and the target output 620. For example, as depicted in FIG. 6, the training system 600 may provide the result output 630 generated by the machine learning model 602 and the target output 620 determined from the user confirmation 614 to the feedback computing unit 604. As described herein, the result output 630 may specify the candidate action indicated in the utterance 610 as determined by the machine learning model 602 and also specify the confidence score of the candidate action. Additionally or alternatively, the result output 630 may specify the utterance content of the utterance 610 as determined by the machine learning model 602 and also specify the confidence score of the utterance content of the utterance 610. On the other hand, the target output 620 may specify the target action that is actually indicated in the utterance 610 as confirmed by the particular user. Additionally or alternatively, the target output 620 may specify the target utterance content that is the actual utterance content of the utterance 610, which is determined from the utterance 610 and the user confirmation 614 provided by the particular user as described herein.

In some embodiments, the feedback computing unit 604 may compute the feedback value 640 based on the result output 630 and the target output 620. For example, if the candidate action indicated in the result output 630 matches the target action indicated in the target output 620, the feedback value 640 may be a difference value between the confidence score of the candidate action and 100%. On the other hand, if the candidate action indicated in the result output 630 does not match the target action indicated in the target output 620, the feedback value 640 may be a difference value between the confidence score of the candidate action and 0%. Other implementations for determining the feedback value 640 are also possible and contemplated.

Additionally or alternatively, the feedback computing unit 604 may compute the feedback value 650 based on the result output 630 and the target output 620. For example, if the utterance content indicated in the result output 630 matches the target utterance content indicated in the target output 620, the feedback value 650 may be a difference value between the confidence score of the utterance content and 100%. On the other hand, if the utterance content indicated in the result output 630 does not match the target utterance content indicated in the target output 620, the feedback value 650 may be a difference value between the confidence score of the utterance content and 0%. Other implementations for determining the feedback value 650 are also possible and contemplated.

In some embodiments, the training system 600 may adjust one or more model parameters of the machine learning model 602 based on the feedback value 640 and/or the feedback value 650. For example, as depicted in FIG. 6, the training system 600 may back-propagate the feedback value 640 and/or the feedback value 650 determined by the feedback computing unit 604 to the machine learning model 602, and adjust the model parameters of the machine learning model 602 based on the feedback value 640 and/or the feedback value 650. For example, the training system 600 may adjust one or more values assigned to one or more coefficients of the machine learning model 602 based on the feedback value 640 and/or the feedback value 650.

In some embodiments, the training system 600 may determine whether the model parameters of the machine learning model 602 have been sufficiently adjusted. For example, the training system 600 may determine that the machine learning model 602 has been subjected to a predetermined number of training cycles. Therefore, the training system 600 may determine that the machine learning model 602 has been trained with a predetermined number of training examples, and thus determine that the model parameters of the machine learning model 602 have been sufficiently adjusted. Additionally or alternatively, the training system 600 may determine that the feedback value 640 and/or the feedback value 650 satisfies a feedback value threshold for a predetermined number of training cycles (e.g., the feedback value 640 and/or the feedback value 650 remains below 5% in 750 sequential training cycles), and thus determine that the model parameters of the machine learning model 602 have been sufficiently adjusted. Other implementations for determining whether the model parameters of the machine learning model 602 have been sufficiently adjusted are also possible and contemplated.

In some embodiments, in response to determining that the model parameters of the machine learning model 602 have been sufficiently adjusted, the training system 600 may determine that the training process of the machine learning model 602 is completed. The training system 600 may then select the current values of the model parameters to be the values of the model parameters in the trained machine learning model 602. In some embodiments, after the machine learning model 602 is sufficiently trained such that the model can perform with an acceptable level of accuracy, the machine learning model 602 may be implemented at the edge device 130, the cloud platform 102, and/or other components of the system 100 and may be used by the voice agent system 300 to determine a candidate action in an utterance and/or to perform a speech recognition operation to determine an utterance content of an utterance.

For example, the voice agent system 300 may input the utterance into the machine learning model 602, and the machine learning model 602 may output the candidate action indicated in the utterance and the confidence score associated with the candidate action. Additionally or alternatively, the machine learning model 602 may output the utterance content of the utterance and the confidence score associated with the utterance content of the utterance. Due to the training process to which the machine learning model 602 is subjected, the accuracy of the machine learning model 602 in determining the candidate action indicated in the utterance and/or determining the utterance content of the utterance may be improved, and therefore the machine learning model 602 may determine the candidate action indicated in the utterance and/or determine the utterance content of the utterance with a relatively high level of confidence.

It should be understood that one machine learning model may be trained and implemented to determine the candidate action indicated in the utterance and/or determine the utterance content of the utterance as described above. Additionally or alternatively, two separate machine learning models may be trained and implemented in a similar manner in which a first machine learning model may be trained and implemented to determine the candidate action indicated in the utterance and a second machine learning model may be trained and implemented to determine the utterance content of the utterance. Other implementations to train and implement the machine learning model are also possible and contemplated.

Embodiments, systems, and components described herein, as well as control systems and automation environments in which various aspects set forth in the present disclosure may be carried out, may include computer or network components such as servers, clients, programmable logic controllers (PLCs), automation controllers, communications modules, mobile computers, on-board computers for mobile vehicles, wireless components, control components and so forth which are capable of interacting across a network. Computers and servers may include one or more processors (e.g., electronic integrated circuits that perform logic operations using electric signals) configured to execute instructions stored in media such as random access memory (RAM), read only memory (ROM), hard drives, as well as removable memory devices (e.g., memory sticks, memory cards, flash drives, external hard drives, etc.).

Similarly, the term PLC or automation controller as used herein may include functionality that can be shared across multiple components, systems, and/or networks. As an example, one or more PLCs or automation controllers may communicate and cooperate with various network devices across the network. These network devices may include any type of control, communications module, computer, Input/Output (I/O) device, sensor, actuator, and human machine interface (HMI) that communicate via the network, which includes control, automation, and/or public networks. The PLC or automation controller may also communicate with and may control other devices such as standard or safety-rated I/O modules including analog, digital, programmed/intelligent I/O modules, other programmable controllers, communication modules, sensors, actuators, output devices, and the like.

The network may include public networks such as the Internet, intranets, and automation networks such as control and information protocol (CIP) networks including Device-Net, ControlNet, safety networks, and Ethernet/IP. Other networks may include Ethernet, DH/DH+, Remote I/O, Fieldbus, Modbus, Profibus, CAN, wireless networks, serial protocols, etc. In addition, the network devices may include various possibilities (hardware and/or software components). The network devices may also include components such as switches with virtual local area network (VLAN) capability, LANs, WANs, proxies, gateways, routers, fire-walls, virtual private network (VPN) devices, servers, clients, computers, configuration tools, monitoring tools, and/or other devices.

Figure 7:
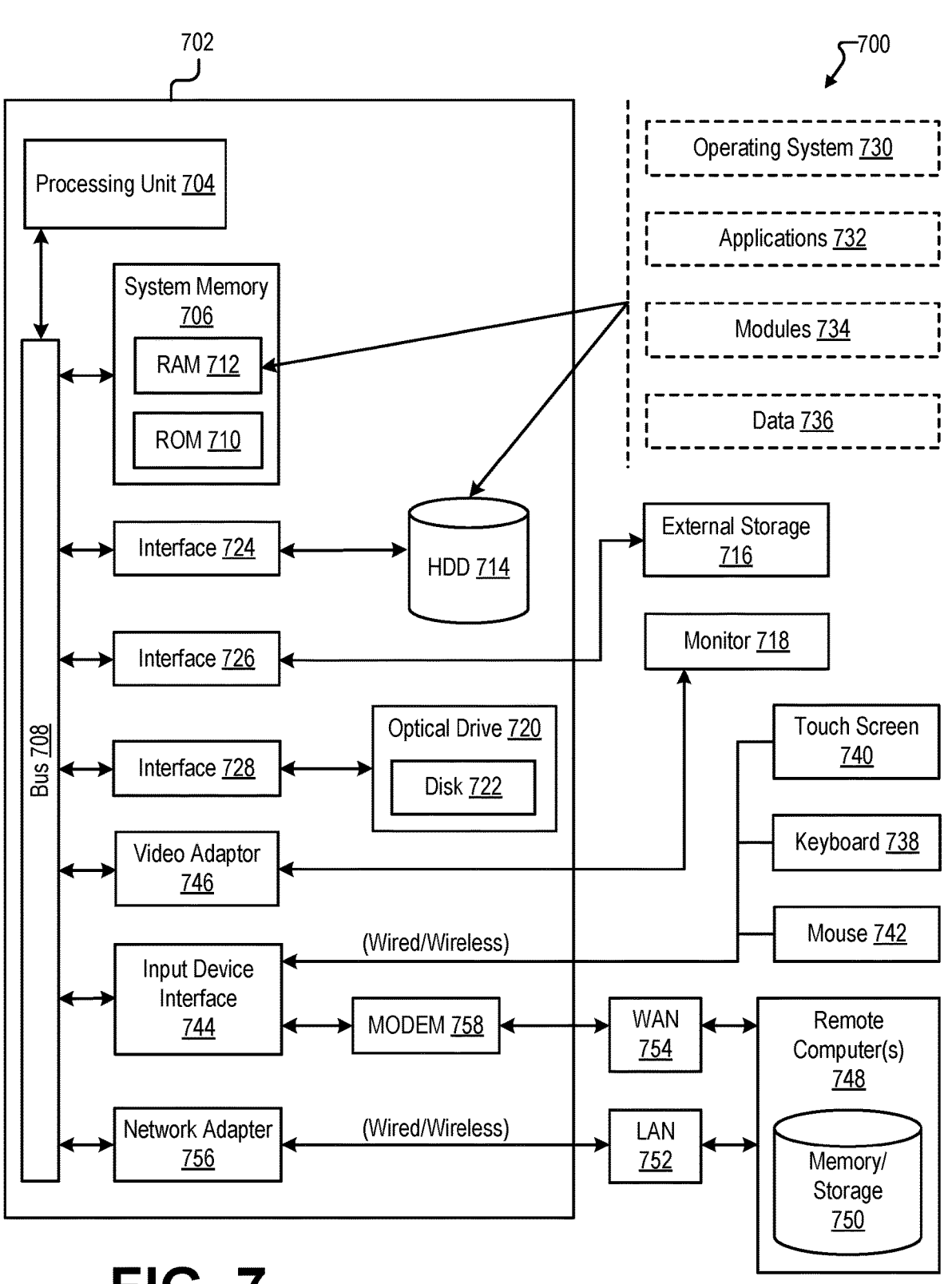
FIG. 7 illustrates an example computing environment.
Figure 8:
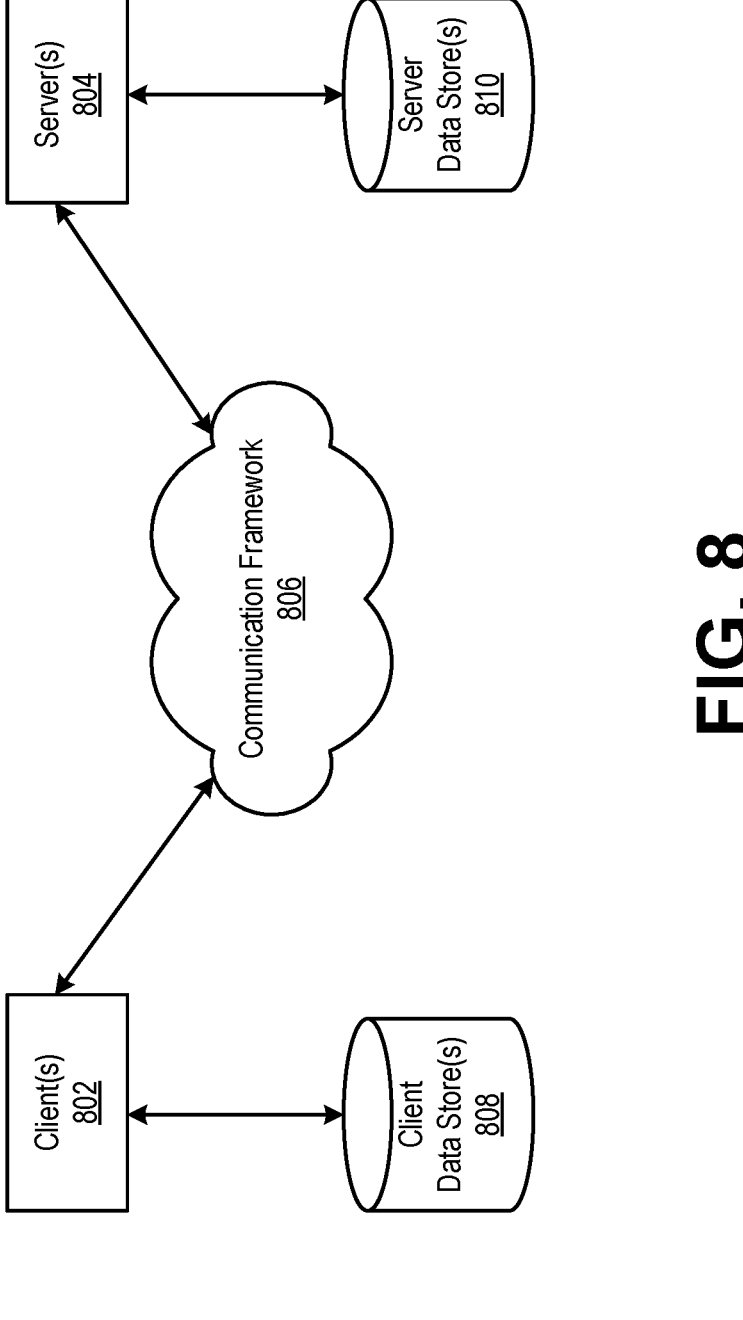
FIG. 8 illustrates an example networking environment.

To provide a context for various aspects of the present disclosure, FIGS. 7 and 8 illustrate an exemplary environment in which various aspects of the present disclosure may be implemented. While the embodiments are described herein in the general context of computer-executable instructions that can be executed on one or more computers, it should be understood that the embodiments may also be implemented in combination with other program modules and/or implemented as a combination of hardware and software.

The program modules may include routines, programs, components, data structures, etc., that perform particular tasks or may implement particular abstract data types. Moreover, it should be understood that the methods described herein may be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which may be operatively coupled to one or more associated devices.

The exemplary embodiments described herein may also be practiced in distributed computing environments where certain tasks may be performed by remote processing devices that are linked through a communications network. In a distributed computing environment, program modules may be located in both local and remote memory storage devices.

Computing devices may include a variety of media, which may include computer-readable storage media, machine-readable storage media, and/or communications media. Computer-readable storage media or machine-readable storage media may be any available storage media that can be accessed by the computer and may include both volatile and nonvolatile media, removable and non-removable media. By way of example and not limitation, computer-readable storage media or machine-readable storage media may be implemented in connection with any method or technology for storage of information such as computer-readable or machine-readable instructions, program modules, structured data or unstructured data. Computer-readable storage media may be accessed by one or more local or remote computing devices (e.g., via access requests, queries, or other data retrieval protocols) for various operations with respect to the information stored in the computer-readable storage media.

Examples of computer-readable storage media may include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage, or other magnetic storage devices, or other solid state storage devices, or other tangible and/or non-transitory media, which may be used to store desired information. The terms "tangible" or "non-transitory" as applied to storage, memory or computer-readable media herein, should be understood to exclude only propagating transitory signals per se as modifiers and do not relinquish rights to all standard storage, memory, or computer-readable media that are not only propagating transitory signals per se.

Communications media may embody computer-readable instructions, data structures, program modules, or other structured or unstructured data in a data signal such as a modulated data signal (e.g., a carrier wave or other transport mechanism) and may include any information delivery or transport media. The term "modulated data signal" or signals refers to a signal that has one or more of its characteristics set or changed to encode information in one or more signals. By way of example and not limitation, communication media may include wired media (e.g., a wired network or direct-wired connection) and wireless media (e.g., acoustic, RF, infrared, etc.).

FIG. 7 illustrates an example environment 700 for implementing various embodiments of the aspects described herein. For example, the environment 700 may implement the system 100, the voice agent system 300, the training system 600, and/or other systems and their components described herein. As depicted in FIG. 7, the environment 700 may include a computing device 702. The computing device 702 may include a processing unit 704, a system memory 706, and a system bus 708. The system bus 708 may couple various system components such as the system memory 706 to the processing unit 704. The processing unit 704 may be any commercially available processor. Dual microprocessors and other multi-processor architectures may also be used as the processing unit 704.

The system bus 708 may be a bus structure that can further interconnect to a memory bus (with or without a memory controller), a peripheral bus, and/or a local bus using any commercially available bus architecture. The system memory 706 may include ROM 710 and RAM 712. A basic input/output system (BIOS) may be stored in a non-volatile memory such as ROM, erasable programmable read only memory (EPROM), EEPROM, etc. BIOS may contain the basic routines for transferring information between elements in the computing device 702, such as during startup. The RAM 712 may also include a high-speed RAM such as static RAM for caching data.

The computing device 702 may additionally include an internal hard disk drive (HDD) 714 (e.g., EIDE, SATA), one or more external storage devices 716 (e.g., a magnetic floppy disk drive (FDD), a memory stick or flash drive reader, a memory card reader, etc.), and an optical disk drive 720 (which may read from and/or write to a disk 722 such as a CD-ROM disc, a DVD, a BD, etc.). While the internal HDD 714 is illustrated as located within the computing device 702, the internal HDD 714 may also be configured for external use in a suitable chassis (not shown). Additionally, while not shown in the environment 700, a solid state drive (SSD) may be used in addition to, or in place of, the HDD 714. The HDD 714, external storage device(s) 716, and optical disk drive 720 may be connected to the system bus 708 by an HDD interface 724, an external storage interface 726, and an optical drive interface 728, respectively. The interface 724 for external drive implementations may include at least one or both of Universal Serial Bus (USB) and Institute of Electrical and Electronics Engineers (IEEE) 1394 interface technologies. Other external drive connection technologies are also possible and contemplated.

The drives and their associated computer-readable storage media may provide nonvolatile storage of data, data structures, computer-executable instructions, etc. In the computing device 702, the drives and storage media may accommodate the storage of any data in a suitable digital format. Although the description of computer-readable storage media above refers to respective types of storage devices, it should be understood that other types of storage media which are readable by a computer, whether presently existing or developed in the future, may also be used in the example operating environment 700, and that any such storage media may contain computer-executable instructions for performing the methods described herein.

A number of program modules may be stored in the drives and RAM 712, including an operating system 730, one or more application programs 732, other program modules 734, and program data 736. All or portions of the operating system 730, the applications 732, the modules 734, and/or the data 736 may also be cached in the RAM 712. The systems and methods described herein may be implemented using various operating systems or combinations of operating systems that are commercially available.

The computing device 702 may optionally include emulation technologies. For example, a hypervisor (not shown) or other intermediary may emulate a hardware environment for the operating system 730, and the emulated hardware may optionally be different from the hardware illustrated in FIG. 7. In such an embodiment, the operating system 730 may comprise one virtual machine (VM) of multiple VMs hosted on the computing device 702. Furthermore, the operating system 730 may provide runtime environments (e.g., the Java runtime environment or the .NET framework) for the application programs 732. The runtime environments may be consistent execution environments that allow application programs 732 to run on any operating system that includes the runtime environment. Similarly, the operating system 730 may support containers, and application programs 732 may be in the form of containers, which are lightweight, standalone, executable packages of software that include code, runtime, system tools, system libraries, settings, and/or other components for executing an application.

In addition, the computing device 702 may be enable with a security module, such as a trusted processing module (TPM). For example, with a TPM, boot components may hash next-in-time boot components, and wait for a match of results to secured values, before loading a next boot component. This process may take place at any layer in the code execution stack of the computing device 702 (e.g., applied at the application execution level or at the operating system (OS) kernel level) thereby enabling security at any level of code execution.

A user may enter commands and information into the computing device 702 through one or more wired/wireless input devices (e.g., a keyboard 738, a touch screen 740, and a pointing device, such as a mouse 742). Other input devices (not shown) may include a microphone, an infrared (IR) remote control, a radio frequency (RF) remote control, or other remote control, a joystick, a virtual reality controller and/or virtual reality headset, a game pad, a stylus pen, an image input device (e.g., one or more cameras), a gesture sensor input device, a vision movement sensor input device, an emotion or facial detection device, a biometric input device (e.g., fingerprint or iris scanner), etc. These input devices and other input devices may be connected to the processing unit 704 through an input device interface 744 that may be coupled to the system bus 708, but may be connected by other interfaces, such as a parallel port, an IEEE 1394 serial port, a game port, a USB port, an IR interface, a BLUETOOTH® interface, etc.

A monitor 718 or other type of display device may be also connected to the system bus 708 via an interface, such as a video adapter 746. In addition to the monitor 718, the computing device 702 may also include other peripheral output devices (not shown), such as speakers, printers, etc.

The computing device 702 may operate in a networked environment using logical connections via wired and/or wireless communications to one or more remote computers, such as remote computer(s) 748. The remote computer(s) 748 may be a workstation, a server computer, a router, a personal computer, portable computer, microprocessor-based entertainment appliance, a peer device, or other common network node. The remote computer(s) 748 may include many or all of the elements in the computing device 702 although only a memory/storage device 750 is illustrated for purposes of brevity. As depicted in FIG. 7, the logical connections of remote computer(s) 748 may include wired/wireless connectivity to a local area network (LAN) 752 and/or to larger networks such as a wide area network (WAN) 754. Such LAN and WAN networking environments may be commonplace in offices and companies, and may facilitate enterprise-wide computer networks (e.g., intranets) all of which may connect to a global communications network (e.g., the Internet).

When used in a LAN networking environment, the computing device 702 may be connected to the local network 752 through a wired and/or wireless communication network interface or adapter 756. The adapter 756 may facilitate wired or wireless communication to the LAN 752, which may also include a wireless access point (AP) disposed thereon for communicating with the adapter 756 in a wireless mode.

When used in a WAN networking environment, the computing device 702 may include a modem 758 or may be connected to a communication server on the WAN 754 via other means to establish communication over the WAN 754, such as by way of the Internet. The modem 758, which may be internal or external and a wired or wireless device, may be connected to the system bus 708 via the input device interface 744. In a networked environment, program modules that are depicted relative to the computing device 702 or portions thereof, may be stored in the remote memory/ storage device 750. It should be understood that the network connections depicted in FIG. 7 are merely example and other implementations to establish a communication link between the computers/computing devices are also possible and contemplated.

When used in either a LAN or WAN networking environment, the computing device 702 may access cloud storage systems or other network-based storage systems in addition to, or in place of, the external storage devices 716 as described herein. In some embodiments, a connection between the computing device 702 and a cloud storage system may be established over the LAN 752 or WAN 754 (e.g., by the adapter 756 or the modem 758, respectively). Upon connecting the computing device 702 to an associated cloud storage system, the external storage interface 726 may, with the aid of the adapter 756 and/or the modem 758, manage the storage provided by the cloud storage system as it would for other types of external storage. For example, the external storage interface 726 may be configured to provide access to cloud storage resources as if those resources were physically connected to the computing device 702.

The computing device 702 may be operable to communicate with any wireless devices or entities operatively disposed in wireless communication such as a printer, scanner, desktop and/or portable computer, portable data assistant, communications satellite, any piece of equipment or location associated with a wirelessly detectable tag (e.g., a kiosk, news stand, store shelf, etc.), telephone, etc. This communication may use Wireless Fidelity (Wi-Fi) and BLUETOOTH® wireless technologies. Thus, the communication may be a predefined structure as in a conventional network or simply an ad hoc communication between at least two devices.

FIG. 8 illustrates an exemplary computing environment 800 with which the embodiments described herein may be implemented. The computing environment 800 may include one or more client(s) 802. The client(s) 802 may be hardware and/or software (e.g., threads, processes, computing devices). The computing environment 800 may also include one or more server(s) 804. The server(s) 804 may also be hardware and/or software (e.g., threads, processes, computing devices). For example, the servers 804 may house threads that implement one or more embodiments described herein. One possible communication between a client 802 and servers 804 may be in the form of a data packet adapted to be transmitted between two or more computer processes. The computing environment 800 may include a communication framework 806 that may facilitate communications between the client(s) 802 and the server(s) 804. The client(s) 802 may be operably connected to one or more client data store(s) 808 that may be used to store information local to the client(s) 802. Similarly, the server(s) 804 may be operably connected to one or more server data store(s) 810 that may be used to store information local to the servers 804.

The foregoing description has been presented for the purposes of illustration and description. It is not intended to be exhaustive or to limit the specification to the precise form disclosed. Many modifications and variations are possible in light of the above teaching. It is intended that the scope of the disclosure is not limited by this detailed description and the modifications and variations that fall within the spirit and scope of the appended claims are included. As will be understood by those familiar with the art, the specification may be embodied in other specific forms without departing from the spirit or essential characteristics thereof.

In particular and with regard to various functions performed by the above-described components, devices, circuits, systems, and/or the like, the terms (including a reference to a "means") used to describe such components are intended to correspond, unless otherwise indicated, to any component which performs the specified function of the described component (e.g., a functional equivalent), even if such component may not be structurally equivalent to the described structure, which illustrates exemplary aspects of the present disclosure. In this regard, it should also be recognized that the present disclosure includes a system as well as a computer-readable medium having computer-executable instructions for performing the acts and/or events of various methods described herein.

In addition, while a particular feature of the present disclosure may have been disclosed with respect to only one of several implementations, such feature may be combined with one or more other features of the other implementations as may be desired and advantageous for a given application. Furthermore, to the extent that the terms "includes," and "including" and variants thereof are used in either the detailed description or the claims, these terms are intended to be inclusive in a manner similar to the term "comprising." In this application, the word "exemplary" is used to mean serving as an example, instance, or illustration. Any aspect or design described herein as "exemplary" is not necessarily to be construed as preferred or advantageous over other aspects or designs. Instead, the use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from a computer-readable device, carrier, or media. For example, computer readable media may include, but are not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
establishing, by a voice agent system, a plurality of user-agent conversations, wherein:
each user-agent conversation between a user and the voice agent system is established in response to the user speaking a trigger word and the plurality of user-agent conversations continue simultaneously in a same physical area, and
the voice agent system is communicatively coupled to one or more industrial devices in one or more industrial automation systems;
detecting, by the voice agent system, an utterance in an audio stream associated with the same physical area;
determining, by the voice agent system and based on the utterance, that the utterance potentially belongs to a particular user-agent conversation among the plurality of user-agent conversations and determining a confidence score that the utterance belongs to the particular user-agent conversation;
identifying, by the voice agent system, a candidate action to be performed by the voice agent system based on the utterance, wherein the candidate action is associated with an industrial device of the one or more industrial devices;
retrieving device information associated with the industrial device;
determining, by the voice agent system, an overall confidence score of the candidate action based at least on:
the confidence score that the utterance belongs to the particular user-agent conversation, and
the retrieved device information; and
performing, by the voice agent system, an operation on the industrial device based on the overall confidence score of the candidate action.

2. The method of claim 1, wherein:
the user-agent conversation between the user and the voice agent system is associated with a voice signature profile of the user.

3. The method of claim 1, wherein determining that the utterance potentially belongs to the particular user-agent conversation includes:
determining a voice signature of the utterance; and
determining that the voice signature of the utterance matches a voice signature profile associated with the particular user-agent conversation.

4. The method of claim 1, wherein determining the confidence score that the utterance belongs to the particular user-agent conversation includes:
determining a voice signature of the utterance; and
determining, with a first confidence score, that the voice signature of the utterance matches a voice signature profile associated with the particular user-agent conversation.

5. The method of claim 4, wherein determining the confidence score that the utterance belongs to the particular user-agent conversation includes:

determining an utterance content of the utterance; and determining, with a second confidence score, that the utterance content of the utterance is relevant to a topic of the particular user-agent conversation.

6. The method of claim 5, wherein determining the confidence score that the utterance belongs to the particular user-agent conversation includes:

determining a user orientation of a particular user associated with the particular user-agent conversation at an utterance timestamp of the utterance; and determining, with a third confidence score, that the particular user orientates towards a different person at the utterance timestamp of the utterance based on the user orientation of the particular user.

7. The method of claim 6, wherein determining the confidence score that the utterance belongs to the particular user-agent conversation includes:

determining a weighted average value of the first confidence score that the voice signature of the utterance matches the voice signature profile associated with the particular user-agent conversation, the second confidence score that the utterance content of the utterance is relevant to the topic of the particular user-agent conversation, and the third confidence score that the particular user orientates towards the different person at the utterance timestamp of the utterance; and determining the confidence score that the utterance belongs to the particular user-agent conversation to be the weighted average value.

8. The method of claim 1, further comprising:

determining, by the voice agent system, that the confidence score that the utterance belongs to the particular user-agent conversation satisfies a confidence score threshold; and including, by the voice agent system in response to determining that the confidence score that the utterance belongs to the particular user-agent conversation satisfies the confidence score threshold, the utterance in the particular user-agent conversation.

9. The method of claim 1, wherein identifying the candidate action includes:

determining an utterance content of the utterance; and identifying the candidate action to be performed by the voice agent system based on the utterance content of the utterance.

10. The method of claim 1, wherein determining the overall confidence score of the candidate action includes:

determining that the confidence score that the utterance belongs to the particular user-agent conversation satisfies a confidence score threshold; and adjusting, in response to determining that the confidence score that the utterance belongs to the particular user-agent conversation satisfies the confidence score threshold, the overall confidence score of the candidate action by a predefined amount.

11. The method of claim 1, wherein determining the overall confidence score of the candidate action includes:

determining a confidence score of an utterance content of the utterance;

determining an emotional distress level of the utterance;

determining a user location of a particular user associated with the particular user-agent conversation relative to the industrial device; and wherein determining the overall confidence score of the candidate action is further based on one or more of the confidence score of the utterance content of the utterance, the emotional distress level of the utterance, the device information associated with the industrial device, and the user location of the particular user relative to the industrial device.

12. The method of claim 1, wherein performing the operation based on the overall confidence score of the candidate action includes one of:

performing, in response to determining that the overall confidence score of the candidate action satisfies a first overall confidence score threshold, the candidate action;

ignoring, in response to determining that the overall confidence score of the candidate action does not satisfy a second overall confidence score threshold, the utterance without performing the candidate action; or requesting, in response to determining that the overall confidence score of the candidate action satisfies the second overall confidence score threshold and does not satisfy the first overall confidence score threshold, a user confirmation of the candidate action from a particular user associated with the particular user-agent conversation.

13. The method of claim 1, further comprising:

detecting, by the voice agent system, a different utterance in the audio stream associated with the physical area;

determining, by the voice agent system, a voice signature of the different utterance;

determining, by the voice agent system, that the different utterance is not spoken by a plurality of users associated with the plurality of user-agent conversations based on the voice signature of the different utterance and a plurality of voice signature profiles associated with the plurality of user-agent conversations; and ignoring, by the voice agent system and in response to determining that the different utterance is not spoken by the plurality of users associated with the plurality of user-agent conversations, the different utterance.

14. The method of claim 13, further comprising:

determining, by the voice agent system, that an utterance content of the different utterance is relevant to a topic of the particular user-agent conversation associated with a particular user among the plurality of user-agent conversations; and using, by the voice agent system and in response to determining that the utterance content of the different utterance is relevant to the topic of the particular user-agent conversation, the utterance content of the different utterance in processing a subsequent utterance in the particular user-agent conversation.

15. The method of claim 14, wherein:

the voice agent system detects the different utterance in a conversation between the particular user located at the physical area and a different person located remotely from the physical area via a user device of the particular user.

16. A voice agent system comprising:

a memory storing instructions; and a processor communicatively coupled to the memory and configured to execute the instructions to:

establish a plurality of user-agent conversations, wherein:

each user-agent conversation between a user and the voice agent system is established in response to the user speaking a trigger word and the plurality of user-agent conversations continue simultaneously in a same physical area, and the voice agent system is communicatively coupled to one or more industrial devices in one or more industrial automation systems;

detect an utterance in an audio stream associated with the same physical area;

determine, based on the utterance, that the utterance potentially belongs to a particular user-agent conversation among the plurality of user-agent conversations and determine a confidence score that the utterance belongs to the particular user-agent conversation;

identify a candidate action to be performed by the voice agent system based on the utterance, wherein the candidate action is associated with an industrial device of the one or more industrial devices;

retrieve device information associated with the industrial device;

determine an overall confidence score of the candidate action based at least on:

the confidence score that the utterance belongs to the particular user-agent conversation, and the retrieved device information; and perform an operation on the industrial device based on the overall confidence score of the candidate action.

17. The voice agent system of claim 16, wherein:

the user-agent conversation between the user and the voice agent system is associated with a voice signature profile of the user.

18. The voice agent system of claim 16, wherein determining that the utterance potentially belongs to the particular user-agent conversation includes:

determining a voice signature of the utterance; and determining that the voice signature of the utterance matches a voice signature profile associated with the particular user-agent conversation.

19. The voice agent system of claim 16, wherein the processor is further configured to execute the instructions to:

determine that the confidence score that the utterance belongs to the particular user-agent conversation satisfies a confidence score threshold; and include, in response to determining that the confidence score that the utterance belongs to the particular user-agent conversation satisfies the confidence score threshold, the utterance in the particular user-agent conversation.

20. A non-transitory computer-readable medium storing instructions that, when executed, direct a processor of a voice agent system to:

establish a plurality of user-agent conversations, wherein:

each user-agent conversation between a user and the voice agent system is established in response to the user speaking a trigger word and the plurality of user-agent conversations continue simultaneously in a same physical area, and the voice agent system is communicatively coupled to one or more industrial devices in one or more industrial automation systems;

detect an utterance in an audio stream associated with the same physical area;

determine, based on the utterance, that the utterance potentially belongs to a particular user-agent conversation among the plurality of user-agent conversations and determine a confidence score that the utterance belongs to the particular user-agent conversation;

identify a candidate action to be performed by the voice agent system based on the utterance, wherein the candidate action is associated with an industrial device of the one or more industrial devices;

retrieve device information associated with the industrial device;

determine an overall confidence score of the candidate action based at least on:

the confidence score that the utterance belongs to the particular user-agent conversation, and the retrieved device information; and perform an operation on the industrial device based on the overall confidence score of the candidate action.

* * * * *